US012670662B2

(12) United States Patent
Davison

(10) Patent No.: US 12,670,662 B2
(45) Date of Patent: Jun. 30, 2026

---

(54) FORMATION OF BOUNDING VOLUME HIERARCHIES

(71) Applicant: Imagination Technologies Limited, Kings Langley (GB)

(72) Inventor: Joseph John Davison, Hertfordshire (GB)

(73) Assignee: Imagination Technologies Limited, Kings Langley (GB)

( * ) Notice: Subject to any disclaimer, the term of this patent is extended or adjusted under 35 U.S.C. 154(b) by 233 days.

(21) Appl. No.: 18/126,411

(22) Filed: Mar. 25, 2023

(65) Prior Publication Data

US 2023/0386122 A1    Nov. 30, 2023

(30) Foreign Application Priority Data

Mar. 31, 2022    (GB) ..................................... 2204657
Mar. 31, 2022    (GB) ..................................... 2204658
(Continued)

(51) Int. Cl.
*G06T 15/50*        (2011.01)
*G06T 1/20*         (2006.01)
(Continued)

(52) U.S. Cl.
CPC .............. *G06T 15/506* (2013.01); *G06T 1/20* (2013.01); *G06T 15/06* (2013.01); *G06T 15/50* (2013.01);
(Continued)

(58) Field of Classification Search
CPC ......... G06T 15/506; G06T 1/20; G06T 15/06; G06T 15/50; G06T 17/005; G06T 17/10; G06T 2210/21; G06T 15/55
See application file for complete search history.

(56) References Cited

U.S. PATENT DOCUMENTS 6,480,849 B1    11/2002  Lee et al.
2014/0168228 A1    6/2014  Luebke et al.
(Continued)

OTHER PUBLICATIONS

Pharr et al., "Physically based rendering : From theory to implementation. Elsevier Science & Technology." 2nd edition. pp. 208-226 (Year: 2010).*

(Continued)

*Primary Examiner* — Alicia M Harrington
*Assistant Examiner* — Christine Yera Ahn
(74) *Attorney, Agent, or Firm* — Potomac Law Group, PLLC; Vincent M DeLuca

(57) ABSTRACT

A method performed by a graphics processor obtains a starting bounding volume hierarchy (BVH), being a data structure comprising nodes representing different 3D regions of space in a modelled environment, the data structure comprising a tree in which the nodes are arranged hierarchically from a root node down to a plurality of leaf nodes, wherein the region modelled by each leaf node encompasses at least one primitive or part of a primitive. The method further comprises performing one or more iterations, starting with a first iteration which starts with the starting BVH as a current BVH, which search for candidate reinsertions to move input nodes to new parents in the tree to reduce expected computational cost.

19 Claims, 10 Drawing Sheets

(30)　　　　Foreign Application Priority Data

Mar. 31, 2022　(GB) ..................................... 2204664
Feb. 8, 2023　(GB) ..................................... 2301775

(51) Int. Cl.
　　 G06T 15/06 　　　(2011.01)
　　 G06T 17/00 　　　(2006.01)
　　 G06T 17/10 　　　(2006.01)
(52) U.S. Cl.
　　 CPC ............ G06T 17/005 (2013.01); G06T 17/10
　　　　 (2013.01); G06T 2210/21 (2013.01)

(56)　　　　References Cited

U.S. PATENT DOCUMENTS

| | | |
|---|---|---|
| 2014/0362074 A1 | 12/2014 | Karras et al. |
| 2014/0365532 A1 | 12/2014 | Karras et al. |
| 2016/0070820 A1 | 3/2016 | Laine et al. |
| 2016/0078588 A1 | 3/2016 | Garanzha |
| 2017/0061673 A1 | 3/2017 | Park et al. |
| 2017/0270146 A1 | 9/2017 | Harrison et al. |
| 2018/0373809 A1 | 12/2018 | Ylitie et al. |
| 2021/0390760 A1 | 12/2021 | Muthler et al. |
| 2023/0027725 A1 | 1/2023 | Chajdas et al. |
| 2023/0099806 A1 | 3/2023 | Oldcorn et al. |
| 2023/0206539 A1 | 6/2023 | Tsakok et al. |
| 2023/0215091 A1 | 7/2023 | Drabinski et al. |
| 2023/0252685 A1 | 8/2023 | Ramesh Babu et al. |
| 2023/0252725 A1 | 8/2023 | Mcallister |
| 2024/0202178 A1* | 6/2024 | Meister .............. G06F 16/2246 |

OTHER PUBLICATIONS

Haber et al., "Enhanced automatic creation of multi-purpose object hierarchies", Computer Graphics and Applications, 2000. Proceedings of The Eighth Pacific Conference on Hong Kong, China Oct. 3-5, 2000.
Kensler, "Tree Rotations for Improving Bounding Volume Hierarchies", 2008 IEEE Symposium on Interactive Ray Tracing, 2008, pp. 73-76.
Meister et al., "Parallel Reinsertion for Bounding Volume Hierarchy Optimization," Eurographics, vol. 37, No. 2, 2018.
Wald et al; "State of the Art in Ray Tracing Animated Scenes"; Computer Graphics Forum : Journal of the European Associates for Graphics; vol. 28; No. 6; No. 6; Apr. 24, 2009; pp. 1691-1722.
Bittner, et al.: "Fast Insertion-Based Optimization of Bounding Volume Hierarchies", (Year: 2013).
Clarberg, et al. "Importance Sampling of Many Lights on the GPU", (Year: 2019).
Garanzha, Kirill: "Efficient clustered BVH update algorithm for highly-dynamic models", 2008 IEEE Symposium on Interactive Ray Tracing. IEEE, 2008. (Year: 2008).

* cited by examiner

100

200

FORMATION OF BOUNDING VOLUME HIERARCHIES

CLAIM OF PRIORITY

This application claims priority under 35 U.S.C. 119 from United Kingdom patent application Nos. GB2204657.7, GB2204658.5 and GB2204664.3, filed on 31 Mar. 2022; and GB2301775.9, filed 8 Feb. 2023, which are hereby incorporated by reference herein in their entirety.

BACKGROUND

A processor is a device for executing a set of machine code instructions including various general-purpose instructions such as add, multiply, etc. An application-specific processor, such as a graphics processing unit (GPU), can be tailored to a specific application by including one or more dedicated hardware modules for performing one or more specific types of operation in fixed-function hardware circuitry. Such hardware may be invoked for example by one or more specialised instruction types in the instruction set of the processor, or by writing to dedicated registers or to a buffer in a dedicated region of memory, or such like, depending on the design of the processor.

Ray tracing is one task which a graphics processor may be used to perform, either in software or dedicated hardware, or more typically a combination. Ray tracing refers to a graphics processing technique for generating an image by tracing a path of light through a modelled environment and simulating the effects of its encounters with objects along the way. Modelled rays of light are traced from a modelled source to a modelled viewpoint (forward ray tracing) or vice versa backwards from the modelled viewpoint to the modelled source (i.e. reverse ray tracing, which is typically more efficient as forward ray tracing often results in processing rays whose trajectory ultimately never hits the viewpoint). A ray may be described by coordinates of an origin of the ray, a vector specifying the direction of the ray, a maximum and minimum extent of the ray along that vector, and optionally a ray colour. Ray tracing begins by casting rays out into the modelled environment, from each pixel in the image in the case of reverse ray tracing. Objects with which rays may interact in the modelled environment are divided into geometric primitives, e.g. triangular facets. For each ray, the ray tracing comprises finding the closest geometric primitive (if any) with which the ray interacts. In some graphics processors this search is performed in fixed function hardware. When an incident ray intersects it can then either terminate, reflect or refract. A reflection or refraction introduces one or more secondary rays with a new direction relative to the incident ray, which is terminated (i.e. the reflected or refracted ray is modelled as a new ray). The secondary rays may also accumulate a new value (colour) relative to the incident ray.

Ray tracing may be performed in software using general-purpose instructions, or in dedicated hardware, or in a combination of these. For example in one GPU design, driver software run on the GPU forms a bounding volume hierarchy (BVH, to be discussed in more detail shortly) which is a data structure that divides a modelled environment into hierarchical regions for search purposes. The driver software writes this data structure to a dedicated buffer in memory. A dedicated "traversal unit" implemented in hardware is arranged to then use the BVH to detect whether various modelled rays (originating from the application software and written to another dedicated region of memory called the ray buffer) would intersect with geometric primitives in the modelled environment.

Determining the effect of an interaction of a ray with a geometric primitive is typically solved analytically in software. The program that does this is called a shader program. There are typically different shader programs that are run to handle different interaction scenarios.

For example, the different shader programs could comprise: a miss shader program, a closest-hit shader program, an any-hit shader program, and an intersection shader program. The miss shader program is run when ray does not hit anything. The closest-hit shader program is run when a ray hits a geometry where it is known that this hit is going to be kept and the program is required to calculate the effects of light at the hit point. The any-hit shader program is run when a ray hits a geometry but the program is also required to decide whether to keep the hit or not. The closest-hit shader program will be run afterwards if the hit is kept. The intersection shader program is run when a ray hits a box with user-defined geometry in it and the program is required to procedurally generate or load up from memory that geometry, check which of these geometries are hit by the ray and then decide whether keep that hit. The closest-hit program will be run afterwards if the hit is kept. The above is a classification derived from the ray tracing API standards. In one implementation the any-hit and intersection shaders may be grouped together into a traverse shader.

More generally, operations done to support ray-tracing may comprise: ray generation (spawn a ray), ray intersection (test a ray against a primitive or a box containing primitives), ray traversal (search a tree of aforementioned boxes or other such scene acceleration structure, and schedule intersections along the walk of the tree).

A bounding volume hierarchy (BVH) is a type of data structure that is used in ray traversal. The data structure of the BVH takes the form of a tree structure, in which nodes represent regions of space (typically boxes) in a modelled environment, and an edge from parent node to child node represents that the region represented by the child node is nested within the region represented by the parent. The nodes are thus arranged in hierarchical levels from a root node down to a leaf node at the lowest level of each branch. The region of space represented by each leaf node contains a respective one or more geometric primitives or at least part of a geometric primitive. The BVH is used in the ray traversal mechanism to search for geometric primitives with which a modelled ray intersects. The search comprises first determining which node the ray would traverse at the first level down from the root, and then determining which of that node's children the ray would intersect, and so forth, until the search ends with finding a leaf node traversed by the ray and determining whether the ray intersects with the primitive or any of the primitives contained within that leaf node.

A simple way to form a BVH would simply be to divide the modelled environment in half, and then divide each half in half again, etc. So at the first level below the root, the root has two child nodes each representing a different half of the space; then each of those nodes (unless it is a leaf) has its own two respective children (grandchildren of the root) at the next level down, each dividing the bounding box of its respective parent in half again, and so forth. At each level the space could be divided in half e.g. by distance, or by number of voxels, or by median coordinate of primitive centroid (each "half" is sized such that it contains half the geometric primitives bounded by its parent, according to the position of the primitive centroids to a plane given by the median coordinate on one axis).

However, the efficiency of searching the tree of the BVH depends on the way the modelled region of space is split between the different nodes of the tree. The simple approach described above will not necessarily result in the tree that, on average, incurs the lowest number of computations to search in order to determine whether a ray intersects with a primitive. There are known metrics for estimating the expected computational cost of searching a BVH. One such metric is known as the surface area heuristic (SAH), which measures the expected computational cost of determining whether a random ray intersects with a primitive for a given BVH.

"Parallel Reinsertion for Bounding Volume Hierarchy Optimization" (Meister and Bittner, 2018) describes a method for optimizing the way in which a modelled space is split into different sized bounding boxes in a binary BVH. The method begins with some starting tree, then iteratively considers different possible "reinsertions". Each possible reinsertion comprises taking an "input node" (one of the child nodes in the existing BVH) and considering moving it to a different part of the tree. The bounds of the affected nodes will be shrunk or grown to accommodate the moving of the input node. If the input node is to be moved, then since the tree is a binary tree, the input node's old sibling will become a "singleton" or "only child", making the old parent redundant. Hence this will mean removing the old parent and making the old sibling the child of the old parent's parent (the input node's old grandparent). And in the place where the input node is to be re-inserted, a new node is created to parent the input node and its new sibling (the "target node"), maintaining the binary structure of the tree.

Meister's method goes through several iterations. Each iteration comprises considering a plurality of possible candidate reinsertions, scoring each candidate reinsertion according to the SAH metric to determine which would be beneficial (i.e. would reduce the expected computational cost), and then selecting to execute at least some of these reinsertions (i.e. updating the BVH with the selected reinsertions). Once the selected reinsertions of the current iteration have been executed, the method loops around to another iteration where it considers further possible reinsertions from the new starting point of the newly updated BVH, and so forth.

SUMMARY

An issue with Meister's approach is that it assumes the tree must always be kept as a binary tree with each reinsertion. It is recognized herein that this unduly restricts the opportunities for reducing the SAH (or such like). Sometimes, for a given input node, a candidate reinsertion that does not assume a binary tree—such as by allowing three children of a given parent—may give a better SAH saving than the possible binary reinsertions of the same input node. It would therefore be beneficial to at least consider, at least in the scoring stage, one or more possible reinsertions that do not retain a strict binary structure throughout the whole tree.

According to one aspect disclosed herein, there is provided a method performed by a graphics processor. The method comprises: obtaining a starting BVH (bounding volume hierarchy), being a data structure comprising nodes representing different 3D regions of space in a modelled environment, the data structure comprising a tree in which the nodes are arranged hierarchically from a root node down to a plurality of leaf nodes, wherein the region modelled by each leaf node encompasses at least one primitive or part of a primitive. The method further comprises performing one or more iterations, starting with a first iteration which starts with the starting BVH as a current BVH. Each iteration comprises: a) for each of a plurality of input nodes in the tree of the current BVH, searching for one or more candidate reinsertions which would move the input node from a respective old parent to a respective new parent in the tree, and which compared to the current BVH would reduce an expected computational cost of searching the tree to determine whether a modelled ray would intersect with one of the primitives (according to a metric such as SAH for estimating the expected reduction); and b) updating the current BVH with one or more selected reinsertions from among the candidate reinsertions. In the searching step of at least one of the iterations, the one or more candidate reinsertions include at least one candidate reinsertion that would leave the old parent with more than one child, and/or give the new parent more than two children.

In embodiments, the method allows for the evaluation of two reinsertion types: binary reinsertions (e.g. as seen in Meister's existing method) and non-binary reinsertions (inserting the node in an existing child list).

In embodiments, the method may comprise determining a starting score being a score of the starting BVH according to a metric for estimating the expected computational cost of searching the tree of the BVH (e.g. the same metric as used to estimate the expected reduction given by the reinsertions), wherein the first iteration starts with the starting score as a current score of the current BVH. Then in each of the iterations, or at least one of the iterations, the updating further comprises updating the current score to account for the update. The current score is a running value of the overall score of the current BVH. This may be used for example to determine whether the current BVH is converging and therefore whether to perform a next one of said iterations or instead terminate the method. As another example the current overall score of the BVH may be used to determine a sparsity parameter for the search in the next iteration. Alternatively, it is not necessary to compute the overall score in each iteration.

In embodiments, each update of the BVH comprises recalculating bounds of bounding volumes modelled by any node having bounds affected by the update to the BVH. Alternatively, it is not necessary to update the bounding volumes every update.

In embodiments, the processor may comprise a buffer comprising a plurality of slots, each respective one of the nodes in the tree being represented as an entry in a respective one of the plurality of slots. In such embodiments, when an old parent is removed in one of said iterations, the respective slot is freed for storing a new entry representing a newly created node created by a further one of the selected reinsertions in the same or a subsequent one of said iterations. Said plurality of slots may be a fixed number of slots.

In further embodiments, the graphics processor may be configured to run a plurality of reinsertion processes, wherein each reinsertion process is configured for a respective input node, and each reinsertion process is identified by a respective process ID. Reinsertion processes or parts of such processes may be executed in parallel with one another. In such embodiments, the reinsertion process for a respective input node may comprise: performing the search for the candidate reinsertions of the respective input node; performing the scoring of the candidate reinsertions of the respective input node to determine the expected reduction in computational cost; and, if any one of the candidate reinsertions of the respective input node is selected as a respective one of the selected reinsertions, performing an execution of the selected reinsertion by performing the updating of the current BVH with the respective selected reinsertion.

In embodiments, the further selected reinsertion (which uses the freed slot) may leave its respective old parent with at least two children, and create the newly created node as the respective new parent in order to accommodate the input node as a sibling of another, target node in the tree.

One issue with allowing non-binary reinsertions is that it may make the program non-deterministic. For instance, consider a scenario where different input nodes are processed by different threads which are scheduled in a round-robin manner or such like. If one thread can free a slot by removing a node from the tree, and another can re-use that slot to create a new node, then the exact behaviour of the program will depend on which thread happens to get scheduled first. Using a strict binary tree, this is not an issue because the removal of the input node from its old position always removes exactly one node, and the insertion of the input node at its new position always creates exactly one new node, so the process handling that reinsertion will just reuse the slot of the deleted node for the newly created node of the same reinsertion. However, if allowing non-binary behaviour, this will not necessarily happen for every possible reinsertion. Whilst not essential, it would be beneficial for the program to allow a non-binary tree while still remaining deterministic—i.e. if re-running the program (e.g. in testing or such like), one will always get exactly the same result for the same frame or same point in time of the same scene.

Therefore in embodiments, in the execution of any of the selected reinsertions, it may be that none of the freed slots is allowed to be used to store an entry representing any node other than a newly created node created by a process with the same process ID as that which freed the slot in the same or a preceding iteration.

That is to say, the processor comprises a buffer comprising a plurality of slots, each respective one of the nodes in the tree being represented as an entry in a respective one of the plurality of slots. Further, different input nodes may be processed by different reinsertion processes (e.g. threads or shader invocations), each reinsertion process being identified by a process ID, and at least some of the reinsertion processes being executed (at least in part) in parallel with one another. In this case when a first one of the reinsertion processes frees a slot by removing a node from the tree, the method may comprise allowing only a reinsertion processes with the same process ID as the first reinsertion process to re-use the freed slot in order to create a new node. The reinsertion process that re-uses the slot may be the first reinsertion process itself or another reinsertion process with the same process ID. Preferably, no freed slot is allowed to be used to store an entry representing any node other than a newly created node created by one of the reinsertion processes with the same process ID as the reinsertion process which freed the respective slot.

Put another way, the processor comprises a buffer comprising a plurality of slots, each respective one of the nodes in the tree being represented as an entry in a respective one of the plurality of slots; wherein the graphics processor is configured to run a plurality of processes including at least some in parallel with one another, wherein each process is configured to process a respective one or more of the input nodes, each process being identified by a respective process ID; wherein in the updating step of at least one of the iterations (one or more freeing iterations), an old parent is removed from the tree and the old parent's respective slot is freed for storing a new entry representing a newly created node created by a further one of the selected reinsertions; and wherein none of the freed slots (no freed slot, i.e. not any freed from any of said freeing iterations) is allowed to be used to store an entry representing any node other than a newly created node created by a process with the same process ID as that which freed the slot in the same or a preceding iteration.

This advantageously provides for a deterministic allocation scheme of new nodes within the operating range of the node buffer.

The method may be implemented by maintaining, for each process ID, a list of free slots that were freed by a process with the respective process ID; wherein each process is only allowed to search for a candidate reinsertion that would use a slot freed in a previous iteration if, on the list associated with the respective process ID, there is a free slot from the same iteration or a previous iteration.

In embodiments, the selected reinsertion processed by the first reinsertion process may comprise a reinsertion that leaves the respective old parent with only one remaining child, such that the respective old parent is removed from the tree and the remaining child becomes the child of the old parent's parent.

In embodiments, the further selected reinsertion may leave its respective old parent with at least two children, and create the newly created node as the respective new parent in order to accommodate the input node as a sibling of another, target node in the tree.

In embodiments, in the execution of at least one of the selected reinsertions, the freed slot may be used to store an entry representing a newly created node created by a process with the same process ID as that which freed the slot in a preceding iteration.

In embodiments, the method may comprise one of said processes searching for a candidate reinsertion that would use a slot freed in a previous iteration, only if the slot was freed by a process in a previous iteration with the same respective process ID as said one of the processes.

In further, alternative or additional features of embodiments disclosed herein, the method may comprise: in each of said iterations in between the identifying of the candidate reinsertions and the updating of the current BVH, performing a conflict resolution to determine whether any of the candidate reinsertions form a subset of conflicting reinsertions which would affect a same part of the tree as one another, and if so, from among each subset so to select only one of the candidate reinsertions as one of the selected reinsertions with which to update the current BVH, the other or others of the candidate reinsertions in the same subset being rejected for inclusion in the update.

Retrying previously conflicted reinsertions (resulting in multiple sets of reinsertions per iteration) advantageously allows for further opportunities for reducing the SAH (or other such metric) without the need for repeating searches for candidate reinsertions. The method may comprise validation of previously conflicted reinsertions before retrying them.

As another alternative or additional consideration, it may be noted that the procedure of searching for, scoring and executing candidate reinsertions over multiple iterations itself incurs processing resource. Therefore it would be beneficial to trade-off the complexity of the optimization search procedure itself versus the likely savings in SAH (or such like) that are likely to be achieved.

Therefore as a further alternative or additional feature of embodiments disclosed herein, in the search for candidate reinsertions in each iteration, the input nodes may be limited to being at or above a predetermined number of hierarchical levels below the root node in the tree of the current BVH.

Most beneficial SAH savings are likely to be found from candidate reinsertions closer to the top of the tree. Therefore by restricting the method to input nodes above a certain search floor, this advantageously restricts the processing burden of the method without undue loss to the likely computational savings in ray traversal. Additionally, target nodes for candidate reinsertions can also be restricted to be above this search floor. This also advantageously restricts the processing burden of the search without undue loss to the likely savings.

In yet further alternative or additional features, in the search for candidate reinsertions in each iteration, the new parent may be limited to being related to the old parent by an ancestor at no more than a predetermined number of hierarchical levels above the input node in the tree of the current BVH.

Most beneficial SAH savings are likely to be found from candidate reinsertions within a certain distance of the input node. Therefore by restricting the search to a certain search ceiling above the input node, this again advantageously restricts the processing burden of the search without undue loss to the likely savings.

A given reinsertion may be defined as an operation which reinserts only a single respective input node (no other nodes of the tree). Thus each of one, more or all of the candidate reinsertions would reinsert only its one respective input node (and no other nodes of the tree). That is to say, each such reinsertion would move only its one respective input node to another branch of the tree (to a position alongside a target node, as opposed to, say, exchanging the input node with the target node).

This means that in each of one, some or all of the candidate reinsertions, the candidate reinsertion either i) increases a number of child nodes at the new parent (e.g. as in the case of a non-binary reinsertion such as in FIG. 7, discussed in more detail later); or ii) adds a new node to the data structure as the new parent (e.g. as in the case of a binary reinsertion such as shown in FIG. 6, also discussed in more detail later).

Any or all of the selected reinsertions, selected for execution from among the candidates, may also be reinsertions meeting the above definition.

The method of any embodiment disclosed herein may be performed by logic implemented in software stored in memory and arranged to run on one or more; or implemented in fixed function hardware circuitry, or in configurable or reconfigurable hardware circuitry such as a PGA or FPGA; or any combination of hardware and software.

In any embodiment, the logic may be embodied in hardware on an integrated circuit. There may be provided a method of manufacturing, at an integrated circuit manufacturing system, a processor comprising said logic. There may be provided an integrated circuit definition dataset that, when processed in an integrated circuit manufacturing system, configures the system to manufacture the logic or processor. There may be provided a non-transitory computer readable storage medium having stored thereon a computer readable description of the logic or processor that, when processed in an integrated circuit manufacturing system, causes the integrated circuit manufacturing system to manufacture an integrated circuit embodying the logic or processor.

There may be provided an integrated circuit manufacturing system comprising: a non-transitory computer readable storage medium having stored thereon a computer readable description of the logic or processor; a layout processing system configured to process the computer readable description so as to generate a circuit layout description of an integrated circuit embodying the logic or processor; and an integrated circuit generation system configured to manufacture the logic or processor according to the circuit layout description.

There may be provided computer program code for performing any of the methods described herein. There may be provided non-transitory computer readable storage medium having stored thereon computer readable instructions that, when executed at a computer system, cause the computer system to perform any of the methods described herein.

The above features may be combined as appropriate, as would be apparent to a skilled person, and may be combined with any of the aspects of the examples described herein.

This Summary is provided merely to illustrate some of the concepts disclosed herein and possible implementations thereof. Not everything recited in the Summary section is necessarily intended to be limiting on the scope of the disclosure. Rather, the scope of the present disclosure is limited only by the claims.

BRIEF DESCRIPTION OF THE DRAWINGS

Examples will now be described in detail with reference to the accompanying drawings in which.

Figure 1:
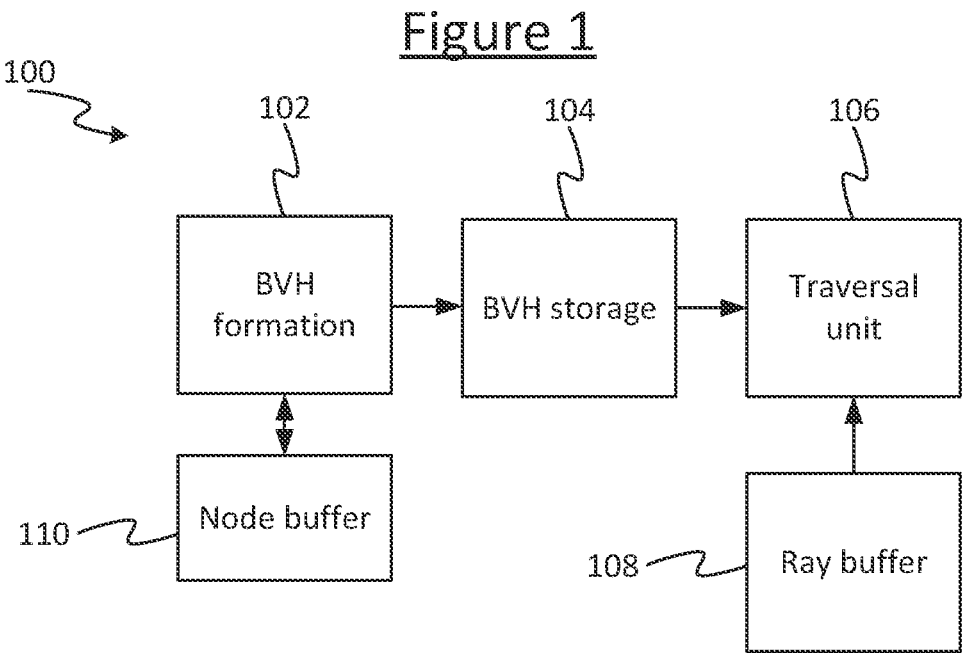
FIG. 1 is a schematic block diagram of some logic for performing ray tracing in software and/or hardware onboard a graphics processor.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments will now be described by way of example only.

The present disclosure provides methods of optimizing bounding volume hierarchies (BVHs) for ray tracing. The quality of an existing hierarchy is improved in a post process that is parallelised for fast execution, in embodiments using compute shaders for execution on a GPU.

According to embodiments disclosed herein, a parallel reinsertion method such as that of Meister may be extended by any one, more or all of the following optimizations.

I. Optimisation of non-binary hierarchies. Non-binary BVHs can improve tracing performance and reduce bandwidth, so being able to optimise existing BVHs that have accounted for this, and output BVHs with these benefits, is a useful trait.

II. Retries of conflicted reinsertions. Instead of discarding proposed updates to the hierarchy due to conflicts with higher scoring reinsertions, they can be reattempted afterwards. This increases the number of useful updates to the BVH per search (the most expensive phase of each iteration). Multiple sets of reinsertions can be executed per iteration using these retries.

III. Only optimising the first $2^k$ nodes in the hierarchy (in breadth first order), reducing computation time with minimal impact to final hierarchy quality.

IV. Restricting the extents of searches for new positions ('targets') in the hierarchy, reducing computation time with minimal impact to final hierarchy quality.

BVH Overview

FIG. 1 schematically illustrates the logic 100 that may implement any one or more of the disclosed methods in accordance with embodiments disclosed herein. The logic 100 comprises a bounding volume hierarchy (BVH) formation module 102, BVH storage 104, a ray traversal unit 106, and a ray buffer 108. Each of the BVH formation module 102 and ray traversal unit 106 is operatively coupled to the BVH storage 104. The traversal unit 106 is also operatively coupled to the ray buffer 108. In operation, the BVH formation module forms a BVH through an iterative process to be discussed in more detail shortly, and stores the resulting BVH in the BVH storage 104. The modelled rays may originate from application software run on the graphics processor or a host processor, and are stored in the ray buffer 108. The ray traversal unit 106 (which could also be referred to as the ray intersection unit or such like) reads the stored BVH from the BVH storage 104, and reads the rays from the ray buffer 108, and uses the BVH to determine whether each of the modelled rays intersects with one or more geometric primitives bounded by the leaves of the BVH.

The logic 100 may be implemented in software stored in one or more memory units and arranged to run on one or more execution units of a graphics processor. Alternatively the logic 100 may be implemented in fixed-function hardware of the graphics processor, or in configurable or reconfigurable circuitry such as a programmable gate array (PGA) or field programmable gate array (FPGA). As another alternative the logic 100 may be implemented in a combination of hardware and software. In one example implementation, the BVH formation module 102 is implemented in driver software of the graphics processor, and the ray traversal unit 106 is implemented as a fixed function hardware unit in the graphics processor. The BVH storage 104 may be implemented in a dedicated memory or dedicated region of memory, such as a RAM, or in dedicated registers. Similarly the ray buffer 108 may be implemented in a dedicated memory or dedicated region of memory, e.g. RAM, or in dedicated registers.

Figure 2:
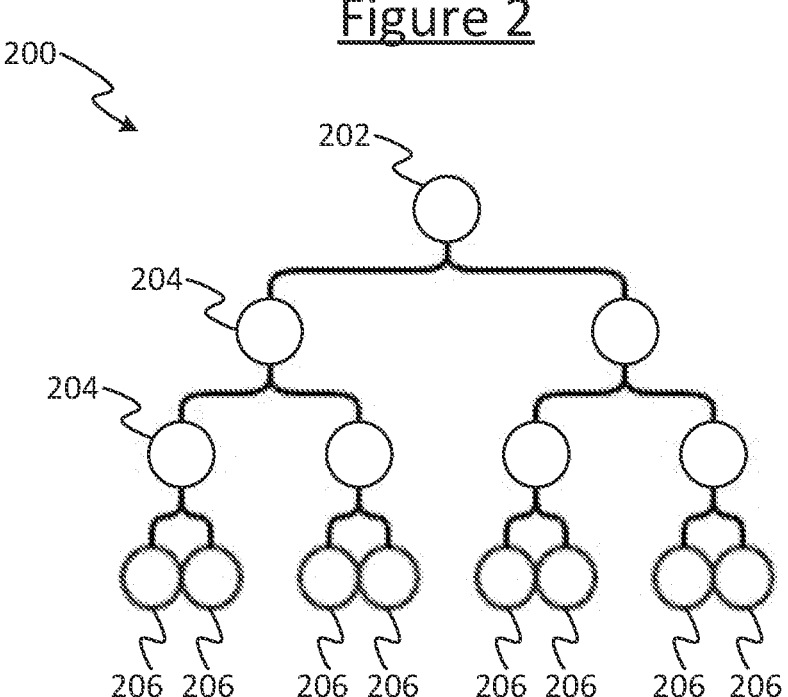
FIG. 2 is a schematic illustration of a bounding volume hierarchy (BVH), FIGS. 3a and 3b give a schematic illustration of some example leaf nodes bounding geometric primitives in a BVH, FIGS. 4a and 4b give a schematic illustration of some further examples of leaf nodes bounding geometric primitives in a BVH.

FIG. 2 illustrates, by way of example, the concept of a bounding volume hierarchy (BVH) 200. The BVH comprises a data structure arranged as a tree, in which the nodes are arranged in hierarchical levels or layers, from a plurality of leaf nodes 206, through one or more levels of internal nodes (204), up to a root node (202). The root node 202 and each internal node 204 (i.e. each node but the leaf nodes 206) are each parents of a respective one or more child nodes, the respective child nodes being either other internal nodes 204 or leaf nodes 206. The root node 202 is only a parent, not a child; and the leaf nodes 206 are only children, not parents. In a binary tree, the root node 202 and each internal node 204 (each node but the leaves) each has exactly two children.

Note: referring to the tree being arranged in level or layers herein does not imply all the leaf nodes 206 must be at the same depth in the tree. In practice BVHs will often be unbalanced and have leaves 206 at different depths.

Each node 202, 204, 206 represents (models) a different respective volume of space—a so-called bounding volume, i.e. a 3D region of space—in a modelled environment. The volume represented by each leaf node 206 encompasses at least one respective geometric primitive or part of a respective geometric primitive. The root 202 typically represents the whole environment. An edge from child to parent represents that the volume of space represented by the child is contained (nested) within the region represented by the parent. Going down the tree from root to leaves, each internal node 204 represents a smaller region of space nested within its parent, until the tree reaches the smallest level of bounding volume at the leaf nodes.

A BVH provides a way of searching a volume of space in a modelled environment for intersections between a ray and a geometric primitive. Geometric primitives are geometric units (e.g. triangular facets) from which larger objects may be formed within the modelled environment. For example an approximation of a curved surface may be made up of multiple smaller triangular facets. Geometric primitives are sometimes just called primitives for short. It is the aim of ray traversal to determine which rays intersect with which primitives within the modelled environment.

Note: geometric primitives as referred to herein are not limited to being simple triangular or polygonal primitives, and the term may also cover the possibility of procedural primitives. These are programmatically defined shapes, e.g. a mathematically defined sphere, with an associated bounding box, for which a shader may be used to determine whether a ray hits the shape once it has determined whether the ray intersects the box.

According to the BVH, the 3D space of the modelled environment is divided into increasingly fine subdivisions, typically boxes, which are described as nodes in a tree (conventionally a binary tree), down to the leaves of the tree which represent the smallest level of subdivision in the hierarchy. In general, depending on the particular scheme being used and the particular geometry being modelled, the bounding volume represented by a given leaf node 206 could encompass exactly one geometric primitive, more than one geometric primitive, or a part (fraction) of a geometric primitive. For example, a certain scheme might have a threshold on the number of primitives a leaf node 206 can contain.

Note that whilst a primitive can be just a single point, primitives will more often be a 2D or 3D shape and so primitives don't necessarily always fit perfectly into one bounding box or another. Bounding volumes may overlap with one another and a given primitive (or part of it) can sometimes be found within bounding volumes other than those that lead to it in the BVH. Further, one can build a BVH that has multiple volumes parenting a single primitive.

Figure 3A:
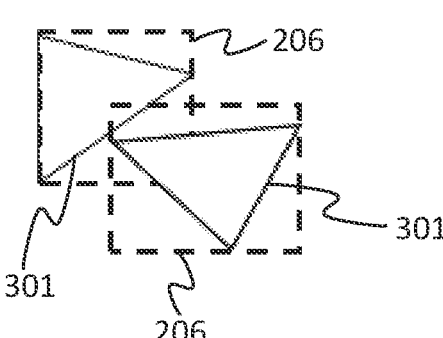
Figure 3B:
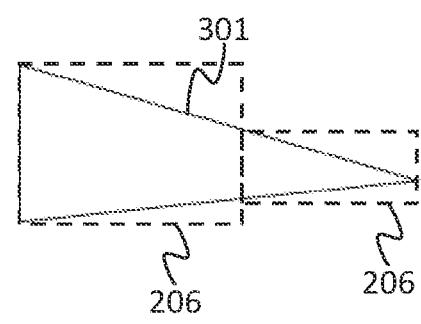

FIGS. 3a and 3b give some examples. In FIG. 3a, the bounding boxes of two leaf nodes 206 overlap, but each only points to their single corresponding primitive 301 (in this case a triangle) in the hierarchy. In FIG. 3b, for the triangular primitive 301, instead of having one large bounding box, it might be beneficial to have two smaller boxes to bound it tighter. So there will be two leaf nodes 206 in the hierarchy that parent the same primitive 301.

Each of the nodes 202, 204, 206 may be represented by data held in a respective slot of a node buffer 110, with one slot per node. The node buffer 110 is maintained by the BVH module 102, and depending on implementation may be implemented in general purpose memory, in dedicated memory or a dedicated region of memory, or in dedicated registers.

For the sake of discussion, individual bounding volumes may be referred to herein as boxes, but this is not limiting and more generally bounding volumes may take any shape. Any reference herein to a bounding box may be replaced more generally with the term bounding volume or region of space.

To determine which primitives a given ray intersects with, the ray traversal unit 106 first determines which bounding box(es) at the top level of the tree the ray intersects with, then within that/those box(es) determines which box(es) at the next level down the ray intersects with, and so forth. This is more efficient than just comparing every primitive against the ray. Note that the procedure doesn't necessarily just stop at the first box the ray intersects with (i.e. it is not assumed that one box is occluded by the other), as a ray could hit a box but still miss all the primitives within that box.

In order to determine the bounding boxes represented by the different nodes 204, 206 in the BVH 200, a simple way to divide the space would just be to divide in half, then divide each half in half again, etc.; for example either by dividing the space in half by distance along a certain axis such as the x-axis, or by dividing either side of the median coordinate along a certain axis such as the x-axis using the x coordinates of the primitives' centroids (in other words, divide the space such that half the primitive centroids fall one side of the division, and the other half of the primitive centroids fall the other side). The centroid of a given primitive could be the centre of mass of the primitive itself (e.g. of the triangle), or the centroid of a bounding box around the primitive.

Figure 4A:
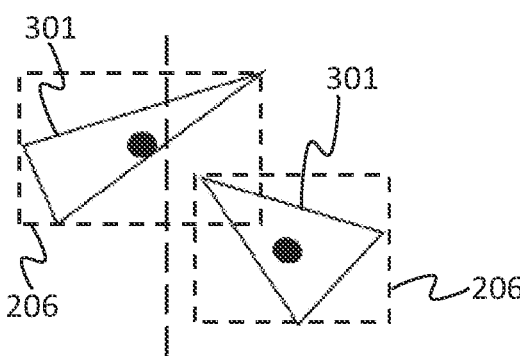
Figure 4B:
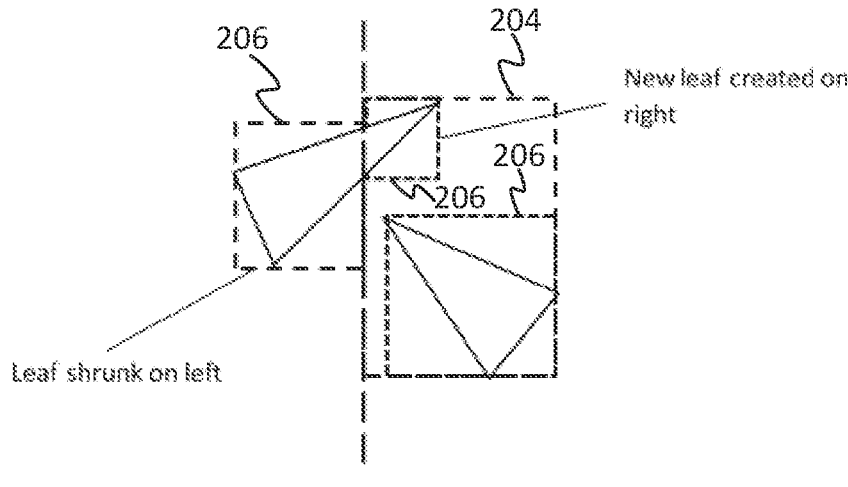

To deal with the fact that a primitive may not be a single point and so primitives don't always fit perfectly into one bounding box or another, a basic implementation of the simple method may use the centroid of a primitive's bounding box to determine which side of a split it should go—the primitives might not be entirely one side or the other and this is where overlaps between boxes may get introduced. FIG. 4a shows an example of this basic "object partition" method which preserves a whole primitive 301 per leaf 206. Here the spots represent the centroids. A somewhat more complex implementation might decide to 'cut through' the primitives and split the box in two, creating a situation like shown in FIG. 4b.

SAH (surface area heuristic) is a metric for scoring the way in which a modelled space is split between nodes of a BVH. For a given tree or subtree, it measures the expected number of computational operations required to determine whether a random ray intersects with a primitive in the tree or subtree. To score a tree or subtree (e.g. the whole BVH or a part thereof), each node at every level in the tree or subtree in question is scored individually, and then the score for the tree or subtree as a whole is the sum of the scores of the individual nodes.

SAH is based on the surface area of the bounding volume relative to the surface area of the root bounding volume, multiplied by its child count. Other metrics also exist that can be used in the same way. E.g. one could just using the surface area of the two boxes, instead of surface area multiplied by child count. SAH may be referred to throughout the following description by way of example, but this is not limiting and more generally this could be replaced by any metric for estimating the expected computational cost of determining whether a ray intersects with a primitive for a given BVH.

Typically when querying a BVH it is desired to find which primitive the ray intersects first—so the 'nearest' intersection to the ray origin. The metric doesn't assume a primitive will be hit—the result of the query could be that the ray misses all primitives. But if it does intersect, then (at least in embodiments) the cost measured by the metric is the expected computational cost of finding the nearest intersection. So the metric measures the expected number of operations to determine a result—hit or miss—and if multiple primitives are hit, the 'nearest' is used. This is how SAH works, for example.

For avoidance of doubt, note that the ray traversal might not necessarily find the nearest intersection first. E.g. if a leaf node is found that is intersected by a ray, and it contains multiple primitives, the ray traversal algorithm may test all those primitives to determine which are hit, and then determine which was nearest; or it may find different leaf nodes that are intersected, and again any intersected primitives would be identified from the different nodes and then the nearest determined.

The BVH formation module 102 may be arranged to find the BVH tree which minimizes SAH (or equivalently optimizes any such metric), i.e. minimizes the average computational cost that will be incurred in ray traversal when searching the tree to determine whether a ray intersects with a primitive. N.B. the terms "minimize" or "optimize" as used herein do not necessarily limit to finding the absolute perfect solution, but rather more generally, can also mean iteratively tending towards an improved solution which might not be the absolute minimum or optimal solution of all theoretically possible solutions, but which is at least a cumulation of the iterative process of refining the SAH score (or such like).

Particularly, the procedure of iteratively modifying the BVH to try to reduce the score itself incurs processing resource, so there is a trade-off to be made between the processing resource put into BVH optimization and the likely savings this will achieve in ray traversal.

The optimization works by starting with some initial BVH tree (e.g. determined in the simple way mentioned above), then considering possible candidate reinsertions—moving a node from one parent to another in the tree. Only if the move (in isolation*) reduces the overall SAH will it be executed by actually updating tree. (*There could be a situation where when two particular reinsertions are executed, with one making the other actually increase the SAH, but this is complex to consider so reinsertions are evaluated individually on the assumption that on average over multiple reinsertions one will usually get a net decrease).

This process of testing candidate reinsertions and then executing the reinsertions may be performed more than once in an iterative manner.

Figures 6, 7:
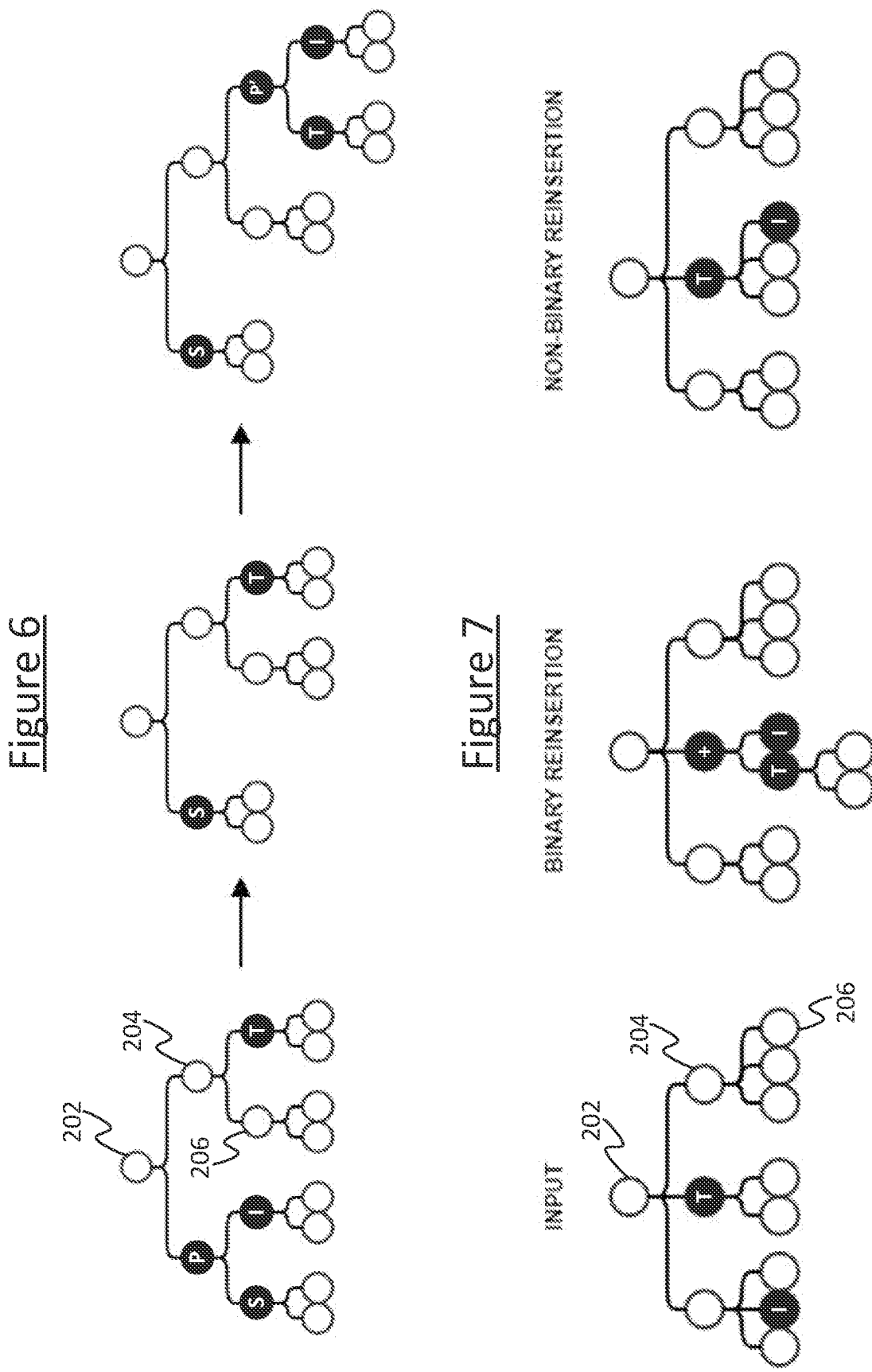

A reinsertion is where an input node I (along with any of its descendants) is removed and reinserted alongside a target node T in the tree of the BVH. An example is shown in FIG. 6. An "input node" herein just means a node in the current BVH which is being moved in a reinsertion (or considered for being moved in a candidate reinsertion), i.e. the input of the reinsertion operation. When an input node I is moved, the bounding volumes of any upstream nodes affected by the move may be shrunk or grown accordingly. For instance in the example shown, the bounds of the parent of P' will be grown to accommodate the bounds of I.

Also, note how the parent P in the left-hand figure disappears, as in this example the tree is a binary tree and a parent can't have only one child. When input node I is removed, parent P has just one child, the input's sibling node S. To maintain the binary structure, the parent P is removed and replaced by the sibling S in the tree. "The slot of this freed node in the node buffer 110 can then be recycled to store a new parent P' of both the input node I and target node T (the new sibling). This process both assumes and maintains a binary tree.

In the scenario where a lone sibling of the input node is left behind, and the old parent of the input node is removed, this may be referred to as "singleton removal". Technically it is the old parent that is removed rather than the singleton itself (if the lone remaining old sibling is called the "singleton"), but this is equivalent to removing the singleton and updating the properties of the parent to match. In practice the "singleton removal" is done by removing the parent rather than the singleton because the singleton already contains most of the data needed (bounds, child pointer, child count etc), so this avoids needing to copy this information into the parent by simply removing the parent instead. So the term "singleton removal" can just mean editing the tree to remove single child cases.

Reinsertions are identified by searching the hierarchy for a target node that maximises the expected SAH reduction for a given input node:

removing the node may shrink the bounds of nodes above it in the tree, reducing SAH (it is also possible for a node to not affect the bounds of nodes above it in the tree—e.g. if the node does not touch any of the sides of the old parent's box, removing it will make no difference to the parent);

reinserting the node may increase the bounds of nodes above, increasing SAH (again it is also possible there will be no effect); and if the reduction outweighs the increase, there is a net benefit to the SAH This expected SAH reduction defines the score for a reinsertion. Reinsertions with positive scores (i.e. which would reduce SAH) are attempted.

Figure 5:
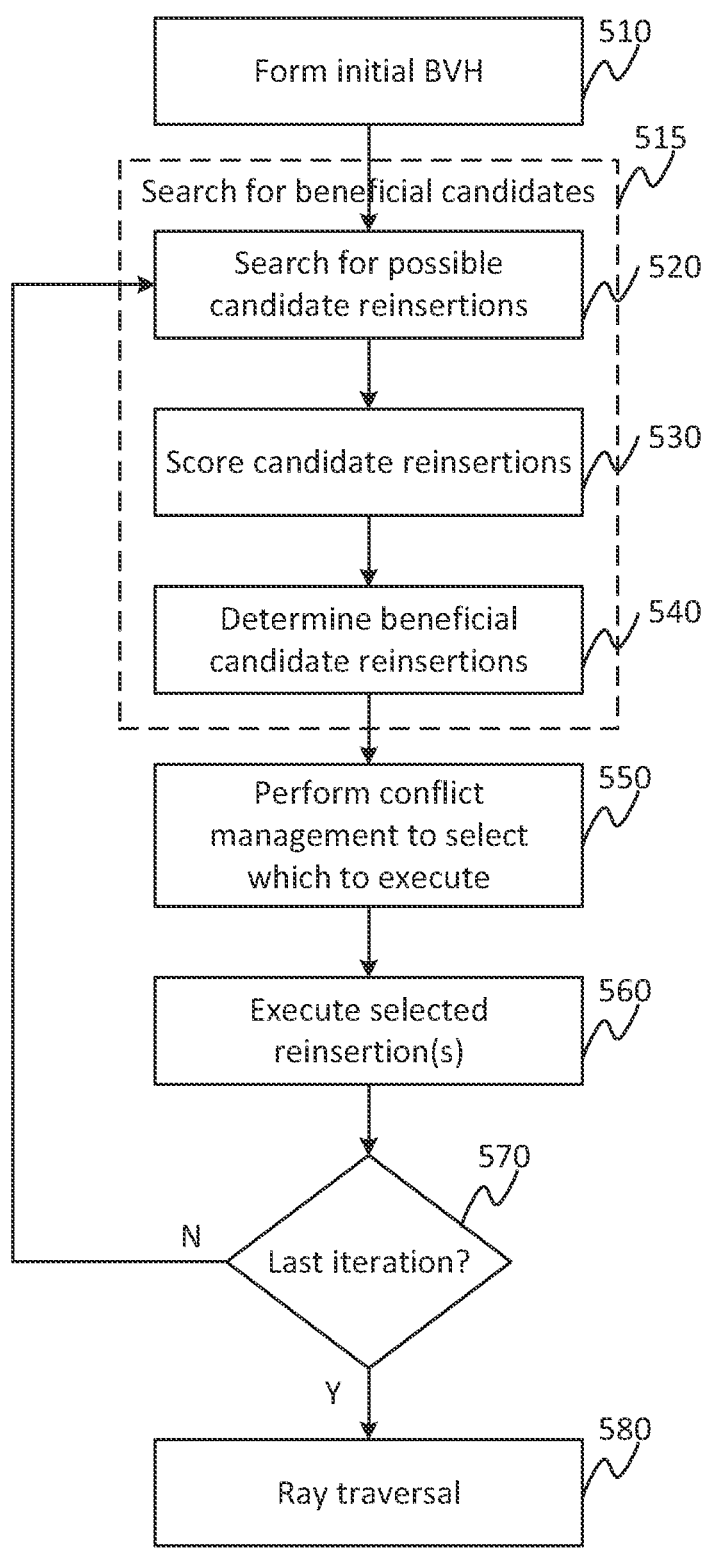
FIG. 5 is a flow chart schematically illustrating a method of forming a BVH, FIG. 6 gives a schematic illustration of an example of a method of reinsertions in the formation of a BVH, FIG. 7 gives a schematic illustration of an example of considering possible binary and non-binary reinsertions in accordance with embodiments disclosed herein.

FIG. 5 illustrates a method of BVH optimization. At step 510, the BVH formation module 102 forms the initial BVH. Optionally it may also determine an overall SAH score for the BVH as a whole (or overall score according to some other metric for measuring estimated computational cost that would be incurred by searching the BVH in ray traversal). However determining the overall score for the whole BVH is not essential as will become apparent shortly.

At step 515 the BVH formation module searches for candidate reinsertions that would be beneficial to the BVH, i.e. that would reduce its SAH (or other such score, i.e. reduce the estimated computational cost that would be incurred by searching the BVH in ray traversal).

The search step 515 may be described as comprising three sub-steps. In sub-step 520, the BVH formation module 102 searches the tree of the current BVH for possible candidate reinsertions. The search for candidate reinsertions may consider all possible input nodes in the tree, or only a subset. In the latter case the subset may be determined by a sparsity parameter. For each considered input node, the search may select one or more possible reinsertions of that node as initial or preliminary candidates for scoring. In sub-step 530, the BVH formation module 102 scores each of the initial candidate reinsertions according to the change in SAH that it would produce if executed. If a reinsertion would improve the score (would decrease the SAH, i.e. reduce the expected computational cost of ray traversal) then in step 540 it may be added to a list of beneficial candidate reinsertions. Otherwise if it would worsen the score, the potential reinsertion will be disregarded. Note that when scoring a potential or candidate reinsertion, it is not necessary to compute the SAH for the whole BVH. Instead it is possible to only compute the delta in the SAH (or similar metric) that would be associated with the candidate reinsertion, i.e. the change or difference in the metric that the candidate reinsertion would bring about if executed. It is this delta which determines the potential benefit (or detriment) of a candidate reinsertion. If the delta in SAH is negative (or more generally the metric represents a reduction in the estimated computational cost associated with ray traversal) then the candidate reinsertion in question would be beneficial, but if the delta in SAH is positive (or more generally the metric represents an increase in the estimated computational cost) then the candidate reinsertion in question would not be beneficial. A greater reduction in SAH represents a more beneficial candidate reinsertion, and this may play a role in determining which reinsertions to put forward as candidates for subsequent steps. It may also determine which candidates are selected for execution, as will be discussed in more detail shortly (see step 550).

Note also that FIG. 5 is somewhat schematized, and in practice sub-steps 520-540 may be intermingled in time. I.e. it is not necessary to wait to determine an entire set of possible candidate reinsertions first before performing any of the scoring or adding candidates to the list of beneficial reinsertions, and instead the possible candidate reinsertions could be scored as the search progresses.

Particularly, the searching 520 and scoring 530 may be performed synergistically with one another. For example, in embodiments the search 515 narrows down to only one candidate reinsertion per input node to be put forward for conflict checking at step 550. To do this, then for each potential input node considered in the search, the search may begin by taking a first possible reinsertion of the input node and scoring this first possible reinsertion (i.e. determining its delta), then scoring a second possible reinsertion of the same input node and if that reinsertion produces a greater reduction in SAH, the second possible reinsertion replaces the first as the current candidate for the input node in question, but otherwise the first reinsertion remains. Then the search scores a third reinsertion and if this beats the current candidate, it replaces the first or second as the current candidate, and so forth. The search may progress over all possible reinsertions; or only a subset of possible reinsertions according to some defined search criterion, and/or until some defined criterion for reduction in SAH is met.

In such an implementation of the search and scoring, step 540 simply determines whether or not the best candidate for each input node does indeed give a reduction in SAH (i.e. does reduce computational cost), and if so includes it on the list of beneficial candidates. This could be done after the search for the best reinsertion of each individual input node, rather than waiting until the end of the search for reinsertions of all considered input nodes.

In embodiments, the search for possible reinsertions of a given input node may begin at the level of the input node (the node potentially being moved), then move up the tree. So the first level of searches will be on nodes below the input node's parent. Then the search moves up a level to include nodes below the input node's grandparent, and so on. Note that nodes below the input node are not included in the search, as it is meaningless to consider moving a node below itself. The search may try out all or a subset of the possible moves at each level. It may only track the change in SAH up to the highest node affected by the move. If the move reduces the SAH, it is added to the candidate list. Each node will have a single 'best move' found so far in the search. If a move reduces the SAH more than the current best, it replaces it as the best move. The search then moves up to the next level in the hierarchy, and repeats this process, and so forth exhaustively all the way up the hierarchy.

At step 550, the BVH formation module 102 determines which of the reinsertions on the list of beneficial candidates to actually execute, i.e. to update the current BVH with to actually include in the tree (so far the candidate reinsertions have only been considered by the BVH formation module 102 as possible or hypothetical moves for scoring purposes). This could simply comprise selecting all the reinsertions from the list, or taking a random selection, or executing the top M most beneficial, or such like. However, in embodiments step 550 may comprise a conflict management step.

Conflicts occur if two (or more) different candidate reinsertions on the list would try to modify the same part of the tree, i.e. if there is any node that both reinsertions would need to modify. An example would be two candidate reinsertions having the same target node. Therefore in embodiments a conflict management process may be included to ensure that if there are candidate reinsertions on the list that would conflict with one another on the candidate list, then only one of them gets executed.

Conflict management may be particularly relevant if reinsertions are to be executed in parallel. When it comes to executing reinsertions, it is desirable to be able to execute multiple of these reinsertions in parallel (simultaneously or concurrently), each by a different parallel process such as a thread or shader invocation. For instance different ones of the processes could be run on different parallel executions units, or different time slots in a barrel-threaded execution unit.

Potential reinsertions could conflict with each other—that is, try to modify the same nodes during execution. When executed in parallel this introduces race conditions. For example, two reinsertions may share the same target, and both would attempt to modify the target node accordingly.

A locking strategy may be used to prevent conflicts in execution. According to this, each candidate reinsertion is represented by a respective reinsertion process or other such portion of code which can "bid" on behalf of the respective reinsertion (e.g. this may be done by a particular bidding thread of a reinsertion process formed from a plurality of threads). Once a candidate reinsertion has been defined, the BVH formation module 102 knows the effect it will have (the nodes it affects and the change in SAH score it achieves). Each candidate reinsertion on the list of beneficial reinsertions must "bid" for ownership of the node(s) that are affected by that reinsertion (or rather, the reinsertion process representing the reinsertion bids on behalf of the candidate reinsertion). If two different candidate reinsertions would conflict (i.e., bid on one or more of the same affected nodes), the one with the best SAH improvement wins and the other had to be discarded. If two have the same SAH improvement, there is a tie breaker criterion, e.g. the one with the largest input node index wins.

A reinsertion must win all bids on the nodes it affects in order to be considered safe to execute in parallel. E.g. bids may be 64-bit unsigned integers: the 32 most significant bits taken from the float score, and the 32 least significant bits the index of the input node. The current bid for a node may be updated by performing an atomic max with the proposed bid. This means reinsertions with higher scores win ownership of affected nodes. The input index is used to deterministically settle tiebreaks on reinsertions with the same score. After the bidding process, bids are checked and reinsertions that fail to win all the required nodes are discarded from the current iteration.

In the context of bidding in conflict management, different strategies can be employed to define how a node may be said to be "affected" by a reinsertion. For example, one strategy may consider whether the reinsertion would change the topology of the tree connecting to or from the node in question (so change its parent, siblings or children). Another strategy may alternatively or additionally consider whether the reinsertion would change the bounds of the node in question.

In embodiments a policy of "sparsity" may be employed for reducing the number of conflicting reinsertions. This means at the search stage 515 considering only a subset of nodes as input nodes for a given iteration. The idea is that the subsequently reduced set of selected reinsertions are less likely to have conflicts with one another. Sparsity may be implemented for example by considering only every nth node (e.g. every third node) in the order stored in memory, or by an order indexed in the tree (location in memory doesn't necessarily map to position in tree, though preferably the nodes that are included as possible inputs should be scattered around the tree, and nodes are typically stored breadth first or depth first). Another example would be to use a random selection of nodes.

In embodiments, the subset may be determined by a sparsity parameter. The sparsity parameter may be settable.

In one particular example implementation, sparsity may be implemented using a sparsity parameter, $\mu$. Instead of processing every node in the hierarchy, every $\mu$th node is processed. A cycling offset is used to process a different set of nodes each iteration. For example, if $\mu=3$, (and noting that the root node is usually stored at index 0, and is never processed as an input) each iteration will process nodes at indices:

1, 4, 7, 10, . . .
2, 5, 8, 11, . . .
3, 6, 9, 12, . . .
1, 4, 7, 10, . . .

Fewer reinsertions means lower chance of conflicts, but also fewer potential improvements to the hierarchy. In embodiments the sparsity parameter p may be decreased during the optimisation (see below), and the optimal starting value may be scene dependent.

In some embodiments the sparsity parameter may be variable from one iteration to the next. For example in embodiments the sparsity parameter may be set based on the current overall SAH of the BVH in the current iteration, e.g. based on how well the total BVH is converging from one iteration to the next.

At step 560 the method executes whichever candidate reinsertions were selected from the list at step 550 (e.g. passed the conflict check). This means updating the structure of the current BVH in temporary storage (e.g. in the node buffer 110) with the selected reinsertions, i.e. to actually include the selected reinsertions in the tree (as opposed to merely considering them as candidates as in preceding step). This may comprise recomputing the overall SAH of the current tree.

Steps 520-560 form one iteration. To recap, in embodiments each iteration may comprise the following operations:
  for each input node, search for best target node to define a reinsertion;
  for each reinsertion, bid on affected nodes;
  for each reinsertion, check bids on affected nodes have been won;
  for each (successful) reinsertion, execute the reinsertion by updating the BVH topology;
  refit bounding volumes for all nodes in the hierarchy; and
  calculate the new SAH of the hierarchy At step 570, the BVH formation module 102 determines whether the iteration just performed at steps 520-560 is to be the last iteration. If not, the method loops back to step 520 and repeats from there using the newly updated BVH now as the current BVH. In embodiments which make use of the total overall SAH of the BVH (not essential), then the total SAH of the graph may be recomputed at this point (or as a variant this could be done at only some iterations).

If on the other hand it is determined at step 570 that the last iteration has been reached, then the method proceeds to step 580 where the BVH formation module 102 writes the final BVH to the BVH storage 104 and triggers the ray traversal unit 106 to go ahead with performing ray traversal based on the latest version of the BVH now stored in the BVH storage 104.

In embodiments the determination as to whether the final iteration has been reached at step 570 could simply comprise determining whether a predetermined number of iterations have been performed, or a threshold time has elapsed, or such like. I.e. after a predetermined number of iterations have been performed, or a predetermined time has elapsed, then at step 570 the method will determine that that was the last iteration and proceed to step 580.

As another example however, the determination is made based on whether a convergence threshold has been reached. There are diminishing returns with each iteration, so once the SAH reductions converge to below some predetermined threshold level, at step 570 the method may stop the iterations and proceed to step 580 so as to go ahead with ray traversal. In other words the above steps are repeated until the optimisation converges to some predetermined degree. The convergence could be determined by comparing the total SAH of the BVH resulting from the latest round of executions in the current iteration with the total SAH that resulted from the previous iteration. Alternatively it could be determined by summing all the individual SAH scores (the individual deltas) of all the executed reinsertions from the current iteration.

In embodiments, a second parameter, the score threshold, may be used to determine whether the optimisation is progressing well. In this case if the reduction in SAH between iterations is below this threshold (or even negative—that is, the SAH has increased) the sparsity parameter $\mu$ will be decremented. This repeats until $\mu=0$, at which point the optimisation terminates.

Example Software Implementation

Computational work to be performed by a parallel processor can be arranged into so called "workgroups" and "threads". A workgroup may comprise one or more threads, where in general that plurality of threads can be processed in series or in parallel (e.g. at a single core of a graphics processing unit). Workgroups may be processed independently of each other (e.g. at different graphics processing unit cores, or in series at a single core of a graphics processing unit). Threads within the same workgroup may be able to synchronise with each other during processing, and may also be able to share access during their processing to memory dedicated to the GPU core processing those threads (e.g. on-chip memory dedicated to the GPU core processing those threads). By contrast, different workgroups may not be able to synchronise with each other during processing, and may not be able to share access during their processing to memory dedicated to a certain GPU core. In the case where a workgroup is formed of a plurality of threads then this may be arranged as an array of threads (e.g. a one-dimensional, two-dimensional or three-dimensional array of threads). The number of threads comprised by a workgroup may be limited. The limit on the number of threads comprised by a workgroup may be a hardware restriction (e.g. a limit on how many threads can be processed in parallel on the available processing hardware). In a common example, a workgroup may comprise up to 1024 threads. In this example, if more than 1024 threads are to be processed in accordance with the same computational program (e.g. shader program), then more than one workgroup will be associated with that computational program. For example, if 3000 threads are to be processed in accordance with the same computational program, then three workgroups may be associated with that computational program (e.g. two of which could be fully packed, the third being partially packed). It is to be understood that the "workgroup" and "thread" terminology used herein is not intended to be limiting, and that other terminology could be used to describe the same concepts. For example, a "thread" as described herein could alternatively be referred to as a "shader invocation", an "invocation" or a "work-item", whilst a "workgroup" as described herein could alternatively be referred to as a "thread block" or a "threadgroup."

In the present context, a reinsertion process (or more briefly a "process") performed in respect of a given input node may comprise a sequence of stages, with a separate thread for each stage. The threads within the reinsertion process are linked by use of the same ID. As such, the reinsertion process could be described as a "thread set" or "program stream" comprising one or more threads. Threads from reinsertion processes for different nodes, but relating to the same step (i.e. in respect of different nodes), may be grouped together into workgroups. The relationship between threads and reinsertion processes is explained in more detail below.

In embodiments each input node I that may potentially be the subject of a reinsertion is processed through several 'steps' of a given reinsertion process, by a respective thread for each step. The thread for a given step may also be referred to as a shader invocation. The software implementing the BVH formation module 102 may comprise blocks of shader code—each defining a 'step' of the reinsertion process—that can be run multiple times to perform its step on different input nodes. For a given step, each thread (shader invocation) will have a unique ID that can be used to identify the portions of data to process for the input node in question (for example, using the ID to derive the input node index for that thread). Some or all of the threads of different input nodes for a given step may be executed in parallel with one another, as a workgroup. In embodiments, the programmer runs N reinsertion processes by specifying the sequence of steps to run, and how many workgroups are needed for each step, where the total number of threads for a step (in accordance with threads per workgroup, and workgroups per step) is at least N. Note that different steps could have different workgroup sizes. Lower-level scheduler hardware or software determines the exact ordering and parallel execution of threads, in accordance with the composition of workgroups and steps defined by the programmer.

In embodiments, shader code is provided for the following steps:

Search: Finding the best reinsertion for a given input node
Bid: Making bids for a given reinsertion
Check: Checking bids have been won for a given reinsertion
Execute: Executing a reinsertion—changes to hierarchy topology
Refit: Updating bounding volumes (e.g. boxes) to reflect changes to the hierarchy
SAH: Scoring the SAH of the hierarchy The reinsertion process for a given input node comprises an invocation of each of the search, bid, check and execute shaders, sharing a common ID. I.e. the search, bid, check and execute shaders are invoked per input node, and the different shaders invoked in respect of the same node are linked by the use of the common ID. The refit and SAH shaders, which are invoked after the reinsertion processes have been performed for an iteration, are not invoked per input node. Instead, the refit shader starts with one thread per leaf node. All threads of the refit shader will attempt to update the box of their parent—with only the last thread being allowed to update a given node (i.e. if two threads try and update a node, only the second thread will actually do it). These successful threads will then attempt to update the subsequent parent the next level up, and so on until a final thread reaches the root. For the SAH shader, a thread is run for all nodes, not just input nodes that may have had a sparse selection.

So rather than having persistent threads processing each input node through an entire iteration, there will be multiple threads running the search shader for their respective input nodes. Then further threads running the bid shader for the selected reinsertions of those respective input nodes, and so on.

For an example, say there are 3000 input nodes up for consideration, and it is desired to process (without any sparse selection of nodes for now) reinsertions for them. If there are 1024 threads to a workgroup, the search, bid, check and execute shaders will all have 3 workgroups run, with one thread per input node. (As there are more threads than input nodes in this case, some threads may not have any work to do.)

If sparsity is employed, this just changes the mapping from thread IDs to indexes of input nodes in the node buffer. So if sparsity is 3, thread with ID 0 will process node 1 in the buffer, thread 1 will process node 4, thread 2 to node 7 etc. In the next iteration, these mappings are offset by one to get a different set of nodes processed: thread 0 processes node 2, thread 1 processes node 5 etc.

In embodiments, all workgroups for one shader must finish before any start for the next shader.

i. The search shader will conduct the full search to find a reinsertion for node X in the buffer (where X is derived from the thread ID). It will store the reinsertion by writing into two other buffer slots: targets[X] and scores[X]. Other shaders can then read these buffers later.

ii. The bid shader will make updates to a bids buffer. E.g. if the reinsertion for node X affects node Y, the respective thread for the reinsertion of node X will try and update bids[Y] to the maximum of its current value and the proposed bid. Because multiple threads could be trying to update bids[Y], this operation is done atomically (i.e. sequentially for updates to the same slot).

iii. Similarly, the check shader then goes through all the affected nodes to ensure the bids have been won for the reinsertion of node X. If not (i.e. it loses a conflict), it sets scores[X]=0.

iv. The execute shader then makes the actual reinsertion of node X, if scores[X]>0.

There is one thread for each step of the iteration, for each input node. And there may be various buffers corresponding to each node to work with. Input nodes are handled on a per-thread-ID basis. Each step for each respective input node is done by an individual thread. Each search shader thread scores all the candidate reinsertions for its own input node, and the corresponding bid thread with the same thread ID will conduct bids on behalf of any beneficial candidate reinsertions of its respective node, and the corresponding execute thread with the same thread ID will update the BVH for any winning bids of the respective input node.

There does not have to be any centralized coordinator to allocate input nodes to threads. Instead each thread can derive the input node it is processing itself, from its own ID. In embodiments, any centralised work is just checking the progress of the optimisation, and is handled CPU-side. Example CPU pseudo-code may look something like this.

```
while (!finished) {
    RunSearchShaderOnGPU(num_workgroups)
    while (retries < 3) {
        RunBidsShaderOnGPU(num_workgroups)
        RunCheckShaderOnGPU(num_workgroups)
        RunExecuteShaderOnGPU(num_workgroups)
        retries++
```

-continued

```
        }
            RunRefitShaderOnGPU(num_workgroups)
            RunSAHShaderOnGPU(num_workgroups)
        }
```

Note:

the loop "while (retries < 3) {. . .}" refers to an example of the conflict retries feature described later.

It will be appreciated that the above is just an example of how the techniques disclosed herein may be implemented in software. More generally, the software may be described as comprising a plurality of processes (or streams of code) where each process performs at least part of the processing of a given respective input node, and at least parts of at least some of the processes or streams may be run in parallel with one another. More generally still, the software may be implemented in any serialized or parallel form or combinations thereof. Note also that "parallel" execution as referred to herein may be taken to cover either execution through different duplicated parallel hardware resources, or concurrent execution in different time slots of barrel threaded execution unit, or a combination of these techniques.

Non-Binary Reinsertions

A constraint of the above optimisation algorithm in the form assumed by Meister is that a binary tree is input, and is maintained throughout the optimisation. It is recognized herein however that it would be desirable to consider possible candidate reinsertions, at least in the search (step 515) for the purpose of being scored, that do not assume that a binary tree must always be maintained, as this will provide more opportunities for reducing SAH. Depending on the scores, such reinsertions may then be included among the list of beneficial reinsertions considered for selection (step 550) or indeed those which are actually executed (step 560), e.g. if they clear the conflict management (step 550). However, extending the concept of reinsertion to BVHs that are not binary trees can result in changes in the number of nodes in the overall BVH, which is not something the Meister algorithm accounts for, nor something the Meister paper considers and thus not something it suggests how to deal with.

Such reinsertions, that do not assume that a binary tree must always be maintained, may include reinsertions whereby the tree of the BVH comprises non-binary parts before and/or after the reinsertion. The reinsertion may leave the old parent with more than one child, and/or give the new parent more than two children. In embodiments, a candidate reinsertion or executed reinsertion may change a binary part of the tree into a non-binary part. And/or, a candidate or executed reinsertions may change a non-binary part of the tree into a binary part.

In embodiments binary reinsertions may be included as well, whether as candidates for scoring or conflict checking, or as actual reinsertions to be executed. As such, some of the reinsertions may still involve singleton removal and insertion of a corresponding new parent for the target node and input node as described earlier in relation to FIG. 6.

Thus embodiments disclosed herein now allow two-types of reinsertion, binary and non-binary. Allowing non-binary reinsertions opens up more opportunities for reducing SAH. The search (515) may now systematically consider both binary and non-binary possibilities.

Non-binary BVHs can have benefits for tracing performance and bandwidth reductions, so it is useful to allow non-binary inputs, that have been built with these benefits in mind, and produce non-binary hierarchies that have these benefits. Therefore, the two types of reinsertion may be used. The binary reinsertion may be implemented as discussed before, with a new node created to parent the target and input node. The non-binary reinsertion sees the input node added to the target's child list. Both reinsertion types can be evaluated during the target search for each candidate target.

FIG. 7 illustrates the possibility of a non-binary reinsertion. The left-hand diagram within FIG. 7 shows an example of a current tree (or part thereof) that may be encountered when allowing non-binary trees. This could either be the starting BVH or the BVH at a current round of iteration. Either way, in the illustrated example the input node I is one of a group of three siblings, i.e. three children of the current respective parent (which would become the old parent under the reinsertions being considered). The middle diagram shows the possibility of a binary reinsertion as discussed earlier with respect to FIG. 6. The only difference here is that as the input node I leaves behind two old siblings, there is no "singleton" left behind as discussed previously with respect to FIG. 6, and so the old parent remains in place (albeit with shrunken bounds). Thus, in this case, the reinsertion is binary, even though the sub-tree of the input node and its parent and sibling nodes is not binary in nature. The right-hand diagram shows an alternative, non-binary reinsertion. Here, instead of becoming a sibling of the target node T and creating a new parent (+) of the target node and reinserted input node, as in the binary reinsertion case, instead the input node I is reinserted as a child of the target node T, forming a group of now three (or more) siblings in the destination branch of the tree, i.e. more than two children of the pre-existing parent or the target node T.

However, relaxing the binary requirement may introduce an additional issue, as briefly mentioned above. It was previously guaranteed that the input's parent node is freed (due to a singleton removal), and that this node is "recycled" as a parent for the input node I and target node T. In other words, the slot in the node buffer 110 that was previously used for the old parent can be re-used for the new parent. However, if allowing a non-binary tree, this singleton removal may not occur. Instead a new node may need to be created without removing an old one. If no slot is freed up in the node buffer by removing an old node, then a new slot in the node buffer 110 will be needed to represent the new node (+).

For example see FIG. 7, right-hand diagram, where the input node I was in a non-binary child list and so the old parent remains. Likewise, a new node is not always needed in the case of a non-binary reinsertion. If, as shown, an input node I is moved from a group of three children of a given parent, leaving still a group of two children of the old parent, then the old parent has to be kept in the BVH. But the move might involve creating a new parent for the moved node. E.g. in the illustrated example, instead of just adding I as another child of T at the same existing level, as in the right-hand diagram of FIG. 7, a new parent node (+) may be created for I and T, effectively performing a binary reinsertion as shown in the central diagram of FIG. 7. The reason is that it might be better in terms of SAH to create this new node. Child count is a factor of SAH, so having a node with lots of children can be costly. It's a question of weighing up whether at this point in the traversal it would be better to: a) definitely do 3 box tests (T's children and I), or b) definitely do 2 box tests (T and I) and then maybe do 2 more box tests on T's children, if T is hit. So if the chances of hitting T and doing those extra 2 tests is less than 50%, the new node is worth it, as the expected tests will be, say, 2+(2*25%) =2.5<3.

However, the number of slots in the node buffer 110 is a finite resource, and so new nodes cannot necessarily be added at will. To accommodate the possible creation of a new node, it would be desirable to provide a scheme to track and allocate free node slots created and used by reinsertions. In embodiments, the optimisation operates on a certain operating range of node slots in the node buffer 110, preferably a fixed range (e.g. indexes 0 to n). Including new nodes in this operating range assists in reducing SAH, as the new nodes could be used as input nodes or selected as target nodes in future iterations.

According to embodiments disclosed herein, free node slots in the operating range will be allocated to the reinsertions that need them. This is preferably done deterministically; because otherwise, allowing a new node to be created at different indexes could, for example, change whether or not it is processed in the next iteration (thus allowing for different possible resultant BVHs after multiple iterations, which would result in different possible performances when rendering the same scene, which is not desirable).

As discussed earlier, in embodiments each input node is processed by a respective reinsertion process comprising one or more threads, where at least parts of at least some of the different processes may be run in parallel with one another. For instance, each process may be configured to perform the search, bid, check and execute-reinsertion steps on behalf of its respective input node. E.g. each process may comprise a plurality of threads, where each of the plurality of threads comprises an invocation of a different respective one of a set of shaders: a search shader, a bid shader, a check shader and an execute-reinsertion shader. Each reinsertion process is identified by a respective process ID. In embodiments where a process comprises a plurality of threads then the threads of that process may each be identified as part of the same process by the respective process ID.

The scheme implemented sees a list maintained for each process ID, each list indicating free node slots created through singleton removals by threads associated with that ID. Threads associated with a particular ID are able to recycle the nodes indicated in the list for that ID for future binary reinsertions. These per-ID free lists ensure deterministic allocation of nodes to reinsertions. Binary reinsertions will only be evaluated if a freed node slot is available to the reinsertion process (e.g. if a previous reinsertion process using the same ID created a freed node slot), or will be immediately created by that process performing a singleton removal. While free node slots will not always be available with this scheme (i.e. a free node slot associated with one ID will not be available to a reinsertion process associated with a different ID), it is still sufficient to produce good SAH reductions (by allowing nodes to be created within the operating range) in a deterministic manner.

To elaborate, it would in principle be possible to just create and destroy slots in memory as-and-when needed, but it would be preferable not to operate like this. This would require a global allocation scheme, where parallel reinsertion processes can be given any free slot in the memory if/when they need one. This has two issues. The first is speed. Multiple parallel processes will want to be allocated a free slot simultaneously, but the global record of where these slots are must be updated atomically (i.e. one at a time). So each process must wait its turn to get the next free slot, wasting time in doing so. The second reason is determinism. The order in which reinsertion processes are allo cated nodes would not be fixed. So nodes could be written at different places in the buffer 110 on different runs of the optimisation. Due to the sparsity feature described earlier, this could result in different nodes being selected in the next iteration, and different changes will be made to the hierarchy.

Instead therefore, in embodiments, at the beginning (step 510) the method starts with a certain number of slots (e.g. 64000) allocated in memory (the node buffer 110), each mapped to an existing node (or alternatively this could be relaxed to include some unmapped slots to play with). Then, as the method proceeds through one or more iterations of the search and execution cycle (steps 520-560), it might happen that a node gets destroyed without a new one needing to be created. E.g. the input node was a sibling of only one other node, so its old sibling becomes a singleton and so the old parent gets removed; but the node being moved gets added as a sibling of an existing group of siblings. If a node's slot gets freed in this way in one iteration, it then makes a node slot available to be used for a new node by the process with the same ID in the same iteration or a subsequent iteration. Thus a new node slot is made available to expand the set of possible moves that can be considered. So during the search of the next iteration it may now be possible to consider a candidate move/reinsertion that would create a new node, whereas those possibilities were ruled out in the previous iteration. Or the freed node's slot could be recycled in the current iteration. E.g. if the input node is one of two children, it can be known that removing it will cause this singleton removal. That way it can be known that a free node will become available and therefore that binary reinsertions can also be considered during the search. Because free nodes are tracked per-process ID, then in such embodiments a freed node slot can only be used by a reinsertion process with the same ID as the process that removed the corresponding node, not from any other reinsertions.

In embodiments, within a given iteration there is one reinsertion process per input node (each process comprising a thread or shader invocation, or a sequence of threads or shader invocations with the same ID, as discussed earlier), and many of these reinsertion processes (in respect of different input nodes) may run in parallel. In subsequent iterations the process ID is reused for another reinsertion process, e.g. to process the same input node at its new location in the tree, or to process an entirely different node. Preferably, a given reinsertion process can only re-use a node slot that has been freed by itself or another process associated with the same ID. Otherwise the method would not be deterministic as it would depend on the thread scheduler. I.e. it would be desirable (e.g. for testing purposes) to always get the same result for the same frame or point in time of the same scene. But if slots could be re-used between parallel processes, the result would depend on whether thread 1 or 2 (for example) happened to get scheduled first from whatever point the process started, and thus get first "dibs" on the recycled slot.

Note: this issue does not depend on which SAH bid was higher, since this is separate from the bidding on existing nodes to avoid conflicts. Parallel processes try to get free nodes once they've been confirmed as 'winning' all their bids. Imagine there is a global list of all the free slots, and each thread that needs one must remove the next slot in the list to claim it. It can't be known whether thread 1 or thread 2 gets to read and update that list first, so it would not be deterministic which thread gets which node.

Conflict Retries

In the algorithm of Meister, if a candidate reinsertion loses a bid in the conflict management, it is simply discarded. But this is potentially wasteful as that doesn't necessarily mean the candidate reinsertion was useless, just because it can't be executed in parallel with another, winning reinsertion within a given iteration.

Searches and scoring are expensive in terms of computational cost. Together they form by the far longest phase of an iteration, so anything that can reduce the number of searches required to reach a given reduction in SAH, and/or which maximizes the improvement per search, is desirable.

In Meister's method, after conflict resolution, any reinsertion that failed to win ownership of all the nodes it required is simply abandoned (not used). It is recognized herein that this is an inefficiency, especially given the cost of finding these reinsertions. Even with the use of sparse inputs, conflicts are still common and limit the SAH reduction for an iteration.

Conflicts prevent the concurrent execution of reinsertions, but may not invalidate them. Therefore, according to embodiments disclosed herein, the method may include a scheme for conflict retries, to reattempt these otherwise discarded reinsertions. In other words the method can re-try a losing reinsertion, after the execution of the winner but still within the same iteration. This increases the number of reinsertions—and therefore the improvement to the hierarchy—executed from each search phase.

For the sake of computational efficiency, in embodiments the re-tried reinsertion is not re-scored; though in other implementations one could do that, i.e. recompute the delta in SAH or other such metric associated with each candidate reinsertion that is to be potentially retried (as the hierarchy has changed since it was last scored).

Either way, preferably it should be checked whether the reinsertion in question is still valid (the new hierarchy could make it nonsensical). Also the retried reinsertion should preferably still be conflict checked again against any other retried reinsertions trying to affect the same part of the tree.

Conflicted reinsertions may be invalidated by changes to the hierarchy when executing a previous set of reinsertions within the same iteration, for one or more of the following reasons:

an input node or target node having been freed during singleton removal;

an input node or target node's slot in the node buffer having been freed during singleton removal and subsequently recycled as a new parent in a binary reinsertion, so the slot now represents a completely different node;

a target node is now a descendent of the input (a node cannot be moved within its own subtree); and/or the reinsertion was binary and required a free node slot to be created from a singleton removal, but there will no longer be one created when removing the input.

Hence in embodiments, after the first set of reinsertions are executed, a set of one or more second reinsertions which previously lost the conflict check may be tried again, within the same iteration. In embodiments this may comprise:

conflicted reinsertions are validated according to the above criteria, discarding those that fail;

bids are reset to zero on all nodes;

remaining reinsertions can rebid on the nodes they affect;

bids are checked, to avoid conflicts; and remaining reinsertions are executed.

As mentioned, the deltas in the individual SAHs need not be recomputed in between retries within a given iteration.

Instead it may be assumed that the delta value for each retried reinsertion remains approximately the same. For these retried reinsertions it will sometimes happen that this approximation is not the case in reality, and a particular individual retried reinsertion could in fact actually increase the SAH; but nonetheless, since the scores of the reinsertions would not tend to change much, the assumption made by not rescoring will still result in an overall reduction in SAH on average for multiple retries over an iteration. Alternatively however, in other embodiment, the deltas in the individual SAH score (or other such metric) may be recomputed for the potentially retried candidates in between rounds of retries within the same iteration. In this case only those candidate reinsertions that would still give a reduction in SAH (or improvement of another such metric), or greater than a threshold reduction or improvement, are retried.

In embodiments, the total SAH score for the BVH is updated once per iteration after all the updates, rather than after each set of updates. However it would also be possible to update the SAH score for the BVH after the first set of updates (i.e. after the execution of the first-time winner reinsertions), and then update the score for the BVH again after the second set of updates (the execution of the reinsertions that won the in round of retry). A further possibility is to not update the SAH score after every iteration, or even not to compute the total overall score of the BVH at all. In other words, e.g. for reasons of computational efficiency, the current score for the BVH may not be considered when deciding whether to continue with a further iteration (at 570 in FIG. 5), or evaluate reducing a sparsity parameter as previously discussed. Therefore, in cases such as these, an updated SAH score does not need to be computed. For example, in the extreme case, it may be decided to perform a fixed number of iterations, and so a SAH score for the BVH is never required to decide whether to iterate or end the optimisation. Omitting the rescoring between each iteration may be advantageous by reducing the calculations and thus processing to perform those iterations. All such approaches are valid.

A similar choice applies to refits of bounding boxes, which can be performed after each set of updates, or after each iteration. Note that updating the SAH score for the BVH after a set of updates (whether between iterations, or before retries within an iteration) would preferably require bounding volumes to be up to date. If it is desired to update the SAH score for the BVH, up-to-date bounds will be required. However if a different metric is being used for the score, that does not take into account the bounding volumes (e.g. just scoring child count), then the bounding volumes don't need refitting.

Also, note that with conflict retries, the topology may be updated over multiple sets of reinsertions, including retries. Then after all retries in an iteration the method may sweep the BVH to refit bounding volumes to reflect those topological changes. So if re-evaluating a reinsertion between retries, the bounding volumes would not necessarily be up to date. If it is desired to update the SAH delta for a reinsertion between retries, up-to-date bounds will be required.

Figure 13:
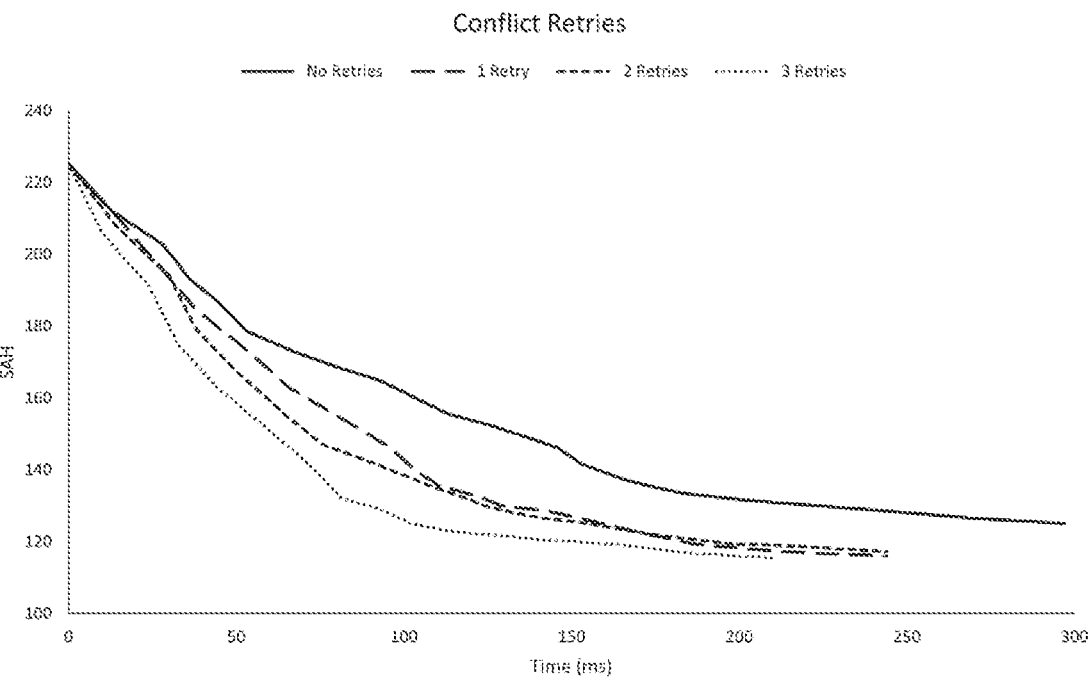
FIG. 13 is a plot of simulated results of SAH reduction achieved by schemes that allow different numbers of conflict retries according to embodiments disclosed herein.

In embodiments, the retrying can be repeated several times, to extract more updates to the hierarchy from a single search step. After all retries, the iteration is wrapped up with bounding box refits and SAH rescore steps as before. While the hierarchy may have changed between a reinsertion being identified and executed, there is a net benefit to these retries. As shown in FIG. 13, optimisations with retries improve SAH faster and can converge to a lower final score.

In some embodiments, the reinsertions to be (potentially) retried may be rescored before their bids are resubmitted. I.e. their SAH reduction is recomputed after the previous winners in the current iteration have been executed, and preferably after the bounding volumes have been recalculated in the updated BVH. In this case, only those reinsertions that are still beneficial after their score has been recomputed will progress to the re-bidding stage. Alternatively however, in other embodiments, to save on computation, the scores of the reinsertions to be retried are not rescored, and instead any that is still valid may progress to the re-bidding stage.

Note also: while sparsity does not eliminate conflicts, only reduces the number of conflicts, embodiments may nonetheless employ sparsity as well as conflict retries. Alternatively sparsity need not be employed, and instead all the possible input nodes could be considered in the search.

Figure 10:
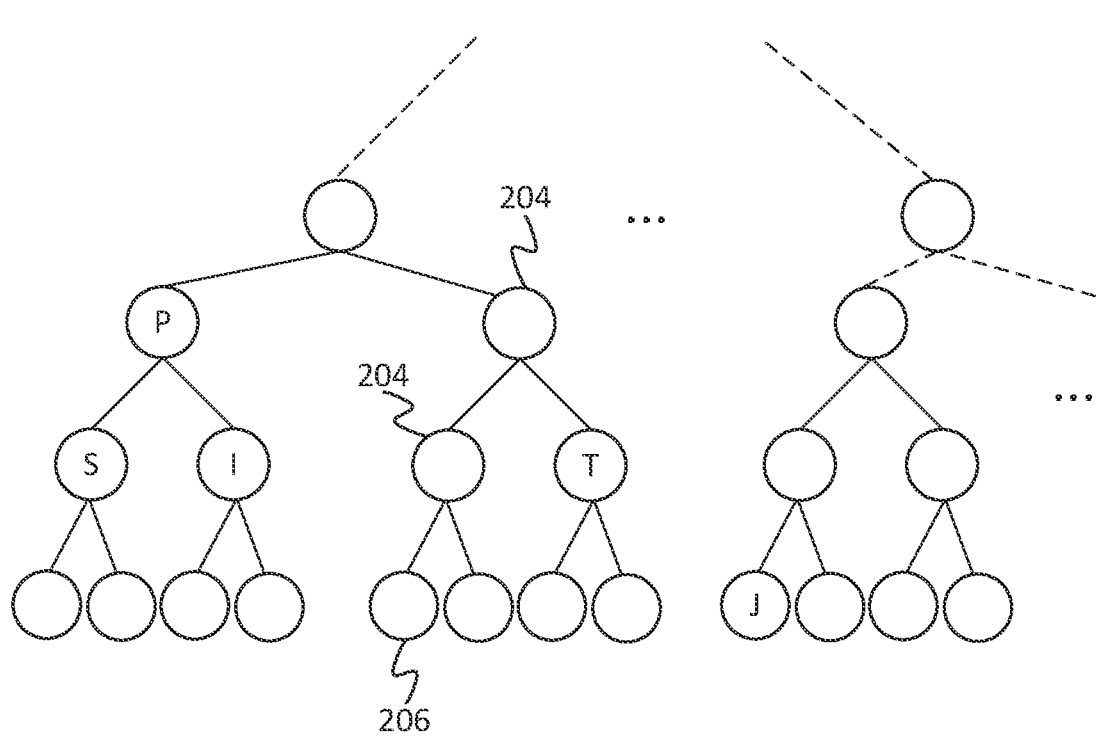

FIG. 10 shows an example of a conflicted reinsertion that may be retried. Again it may be assumed that the candidate reinsertion of each input node is represented by a different reinsertion process (each comprising one or more threads.

Say that process 1 wants to perform a reinsertion to move its input node I from P to T as its new parent, and that process 2 wants to perform a different reinsertion to move another input node from elsewhere in the tree—say node J—to T as its new parent. Even in a non-binary example where T can have a flexible number of children, this should preferably not be done in parallel as otherwise the effect would be random—process 2 could end up overwriting the result of process 1 or vice versa.

The conflict management resolves this—both process 1 and 2 can bid to take ownership of T (and other nearby nodes whose topology would be affected by the proposed reinsertion). However conventionally the losing process (e.g. process 2 if process 1 won the bid) would have to abandon its candidate reinsertion, wasting the work that was done searching for that reinsertion, even though the losing reinsertion may still be valid and beneficial even after the winning reinsertion has been executed.

By allowing conflict retries on the other hand, both reinsertions can potentially still be used. Say that process 1 wins the initial bid over T. Since (in the non-binary case), this does not exclude thread 2 also making its addition, process 2's reinsertion can be re-tried.

All the reinsertion processes with winning reinsertions execute their reinsertions, and there is a barrier to wait for all of them to finish, then threads with losing reinsertions can try again. This is slower than doing all the reinsertions without a barrier, but that is not preferred due to conflicts.

Figure 11:
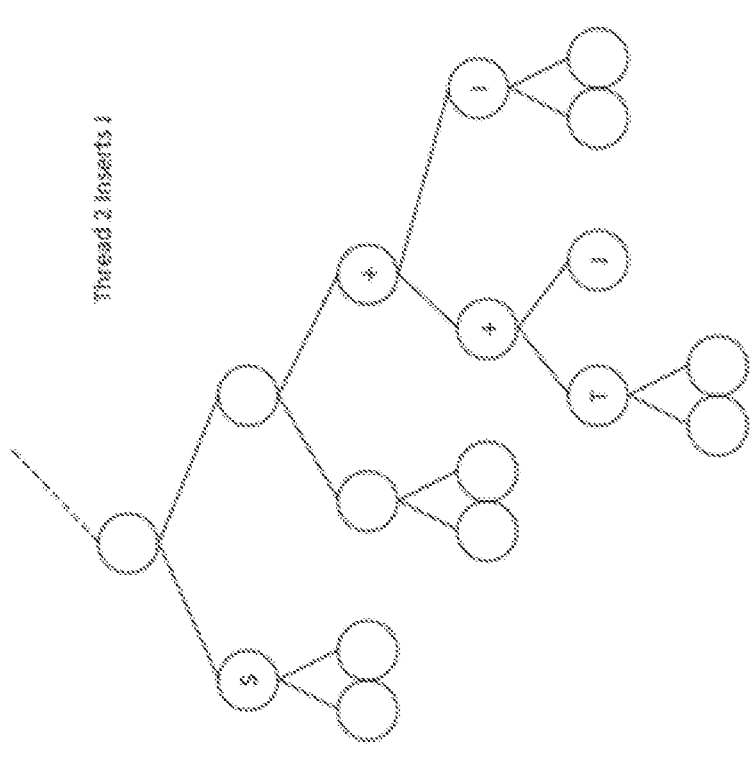
Figure 11:
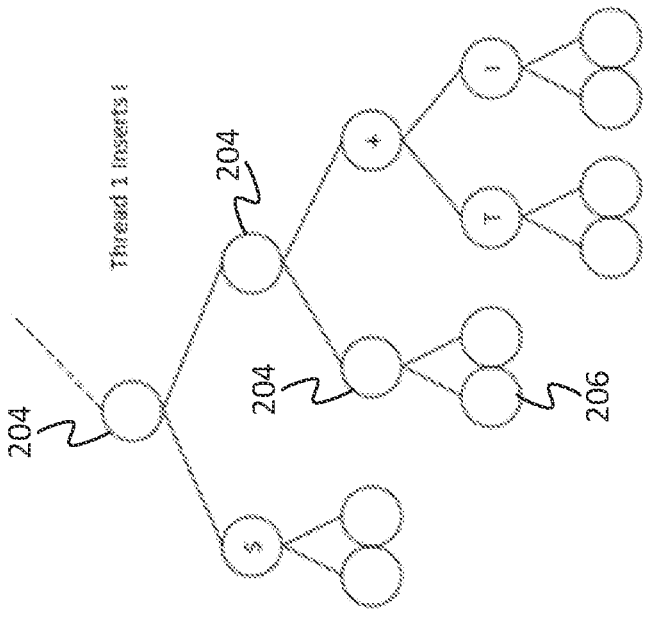

The above described scheme of conflict retries is not limited to non-binary reinsertions or BVHs that allow non-binary trees. FIG. 11 shows and example of a reinsertion that may be re-tried in a purely binary scenario. This is like the example in FIG. 10, except that both I and J are moved in binary reinsertions. After the first reinsertion of I, T is still a valid target, so J can be paired with it in a second reinsertion.

Reduced Search Scope

In principle a node could be reinserted anywhere, but reinsertions are more likely to give a good score if the destination of the input node is close to its old position in the tree. It is recognized herein therefore that it would be possible to reduce the computational cost of the search for candidate reinsertions, by restricting the scope of the search (step 515), without being likely to have an undue effect—if any—on the reduction in SAH that is achieved.

Most improvement in SAH is made by changes closer to the root node of the BVH. Therefore in embodiments the method may be restricted to only trying to move nodes (i.e. only considering possible input nodes) above a certain depth in the hierarchy, i.e. those closer to the root. This could be thought of as a "search floor" in the tree. Or as a variant of this, the method could employ less sparsity closer to the root than at the leaves. More generally, the restriction may be described by saying that: the input nodes are restricted to being from a subset close to the root, and this could be achieved by, e.g., a restriction on depth, or using a breadth-first ordering to get some number of nodes (with the $2^k$ approach below being an example of this).

Closer to the root, nodes are associated with larger bounding volumes and so with larger surface areas, and so the potential savings are greater. This presents an opportunity to reduce the scope of the optimisation (i.e. the scope for search), with limited impact on the final hierarchy quality.

In embodiments, there may be two constituent rules to this restriction. The first is that input nodes are selected from a subset of nodes close to the root (e.g. not lower than a depth D, or first N nodes in breadth first order). This reduces work for the whole iteration as there are fewer reinsertions to process. The second rule is that target nodes may also be restricted to this subset. This reduces the search space. The second rule requires the first because it wouldn't be advantageous to restrict targets to the top of the tree if an input node was far away at the bottom of the tree.

In embodiments, the hierarchy is read in to the node buffer 110 breadth-first, meaning that nodes are sorted according to their distance from the root. The first $2^k$ nodes in the buffer then define the scope of the optimisation—input nodes and/or target nodes must be within this 'operating range'. Reducing this node count results in less nodes to process each iteration, and also a reduced search space when finding target nodes. Refits and rescores of the hierarchy also benefit, as nodes outside of this range will have fixed bounds and SAH scores, so do not need to be accounted for between iterations.

Figure 14A:
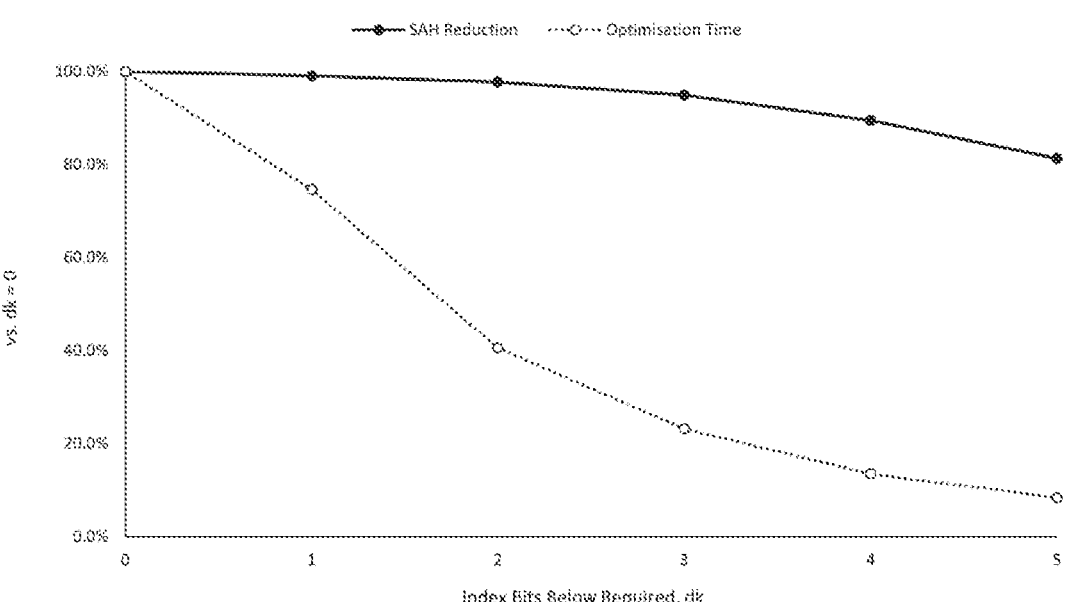
FIG. 14a is a plot of simulated results of SAH reduction achieved by imposing a search floor in accordance with embodiments disclosed herein.

The selection of k introduces a time vs. quality trade off, where reducing the scope saves optimisation time but may impact final hierarchy quality. The method selects k relative to the number of nodes input. For example, if a hierarchy has $2^{17}$ nodes (rounded up to a power of two), the first $2^{14}$ nodes could be a processed—a difference of 3 on the value of k. FIG. 14a shows the impact of this difference, dk, against an unconstrained approach.

Significant run time savings can be made for very little cost in hierarchy quality. By way of example, dk=3 may be selected for a good balance between the two.

A fixed upper bound, in this case of k≤16, is also set, to prevent very long run times. So for an input hierarchy with n nodes and dk=3:

$$k=\min\{\lceil \log_2(n)\rceil-3,16\}$$

This is just an example. More generally, any number M of nodes within some defined depth of the root may be used, instead of necessarily $2^k$. Using M will still have the same effect and time-quality trade-offs.

Furthermore, as an alternative or additional restriction on the search scope, some unlikely possibilities may be culled without explicitly scoring them, by instead setting a "search ceiling", i.e. a maximum height which can be affected in the tree above the candidate input node. E.g. if the ceiling is 3, then only moves to other positions below the great grandparent can be considered.

This narrows the search space when finding the target node. The majority of optimal target nodes are found relatively close to the input, compared to the extents of an unconstrained search.

Figure 12:
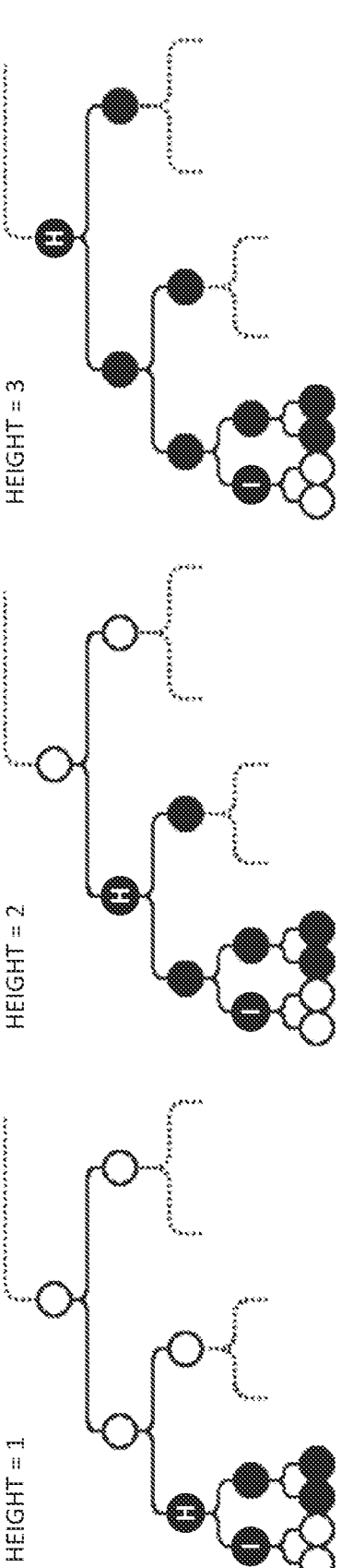

In embodiments, the search progresses as follows. The highest node reached during the search is tracked, with the current search space being the subtree rooted at this node (minus the input node and it's descendants). Once the current extents have been searched (depth-first), the highest node is moved up to its parent, expanding the search space. In the Meister paper this continues until the highest node is the root. See FIG. 12.

Figure 14B:
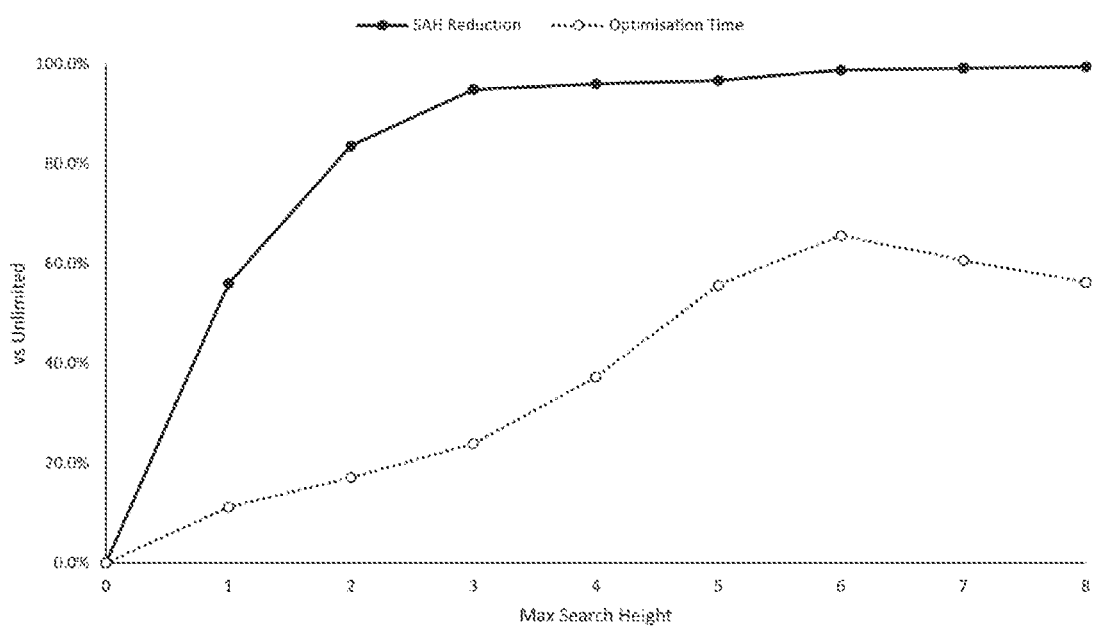
FIG. 14*b* is a plot of simulated results of SAH reduction achieved by imposing a search ceiling in accordance with embodiments disclosed herein.

By limiting the distance between the input node and highest node, the extents of the search can be easily restricted. FIG. 14*b* illustrates the trade-off between run time and hierarchy quality when selecting this height limit. By way of example, a maximum height around 4 or 5 gets good run time savings at little cost.

The search ceiling could be used independently of the search floor or in combination.

Example System Implementation

Figure 8:
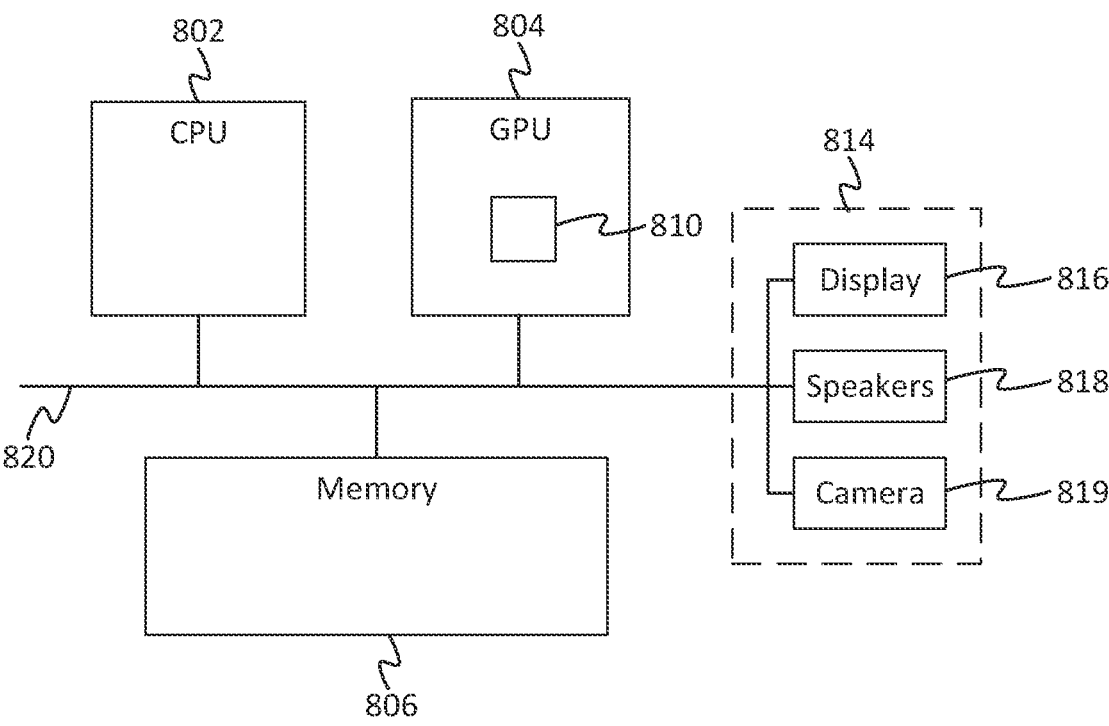
FIG. 8 is a schematic block diagram of a computer system in which a graphics processing system is implemented.

FIG. 8 shows a computer system in which the graphics processing systems described herein may be implemented. The computer system comprises a CPU 802, a GPU 804, a memory 806 and other devices 814, such as a display 816, speakers 818 and a camera 819. A processing block 810 (corresponding to the logic 100 of FIG. 1) is implemented on the GPU 804. In other examples, the processing block 810 may be implemented on the CPU 802. The components of the computer system can communicate with each other via a communications bus 820. A store 812 (which may correspond, at least in part, to memory 104 in FIG. 1) is implemented as part of the memory 806.

The logic of FIGS. 1 to 7 is shown as comprising a number of functional blocks. This is schematic only and is not intended to define a strict division between different logic elements of such entities. Each functional block may be provided in any suitable manner. It is to be understood that intermediate values described herein as being formed by the logic need not be physically generated by the logic at any point and may merely represent logical values which conveniently describe the processing performed by the logic between its input and output.

The logic described herein may be embodied in hardware on an integrated circuit. The logic described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture logic configured to perform any of the methods described herein, or to manufacture a logic comprising any apparatus described herein. An integrated circuit definition dataset may be, for example, an integrated circuit description.

Therefore, there may be provided a method of manufacturing, at an integrated circuit manufacturing system, logic as described herein. Furthermore, there may be provided an integrated circuit definition dataset that, when processed in an integrated circuit manufacturing system, causes the method of manufacturing the logic to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture the logic will now be described with respect to FIG. 9.

Figure 9:
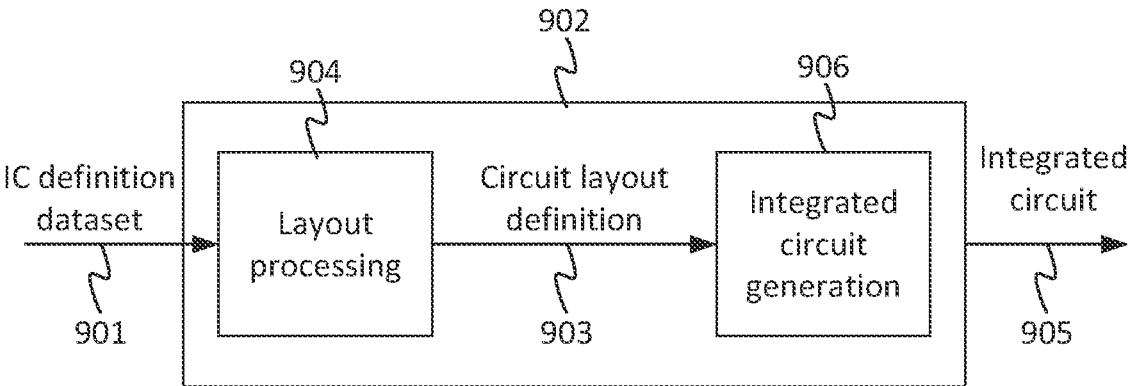
FIG. 9 is a schematic block diagram of an integrated circuit manufacturing system for generating an integrated circuit embodying a graphics processing system, FIG. 10 gives a schematic illustration of an example of conflicting candidate reinsertions whereby one of the reinsertions may be retried in accordance with embodiments disclosed herein, FIG. 11 gives a schematic illustration of another example of conflicting candidate reinsertions whereby one of the reinsertions may be tried in a subsequent iteration in accordance with embodiments disclosed herein, FIG. 12 gives a schematic illustration of limiting a search ceiling in a search for reinsertions in accordance with embodiments disclosed herein.

FIG. 9 shows an example of an integrated circuit (IC) manufacturing system 902 which is configured to manufacture logic as described in any of the examples herein. In particular, the IC manufacturing system 902 comprises a layout processing system 904 and an integrated circuit generation system 906. The IC manufacturing system 902 is configured to receive an IC definition dataset (e.g. defining logic as described in any of the examples herein), process the IC definition dataset, and generate an IC according to the IC definition dataset (e.g. which embodies logic as described in any of the examples herein). The processing of the IC definition dataset configures the IC manufacturing system 902 to manufacture an integrated circuit embodying logic as described in any of the examples herein.

The layout processing system 904 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 904 has determined the circuit layout it may output a circuit layout definition to the IC generation system 1006. A circuit layout definition may be, for example, a circuit layout description.

The IC generation system 906 generates an IC according to the circuit layout definition, as is known in the art. For example, the IC generation system 906 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 906 may be in the form of computer-readable code which the IC generation system 906 can use to form a suitable mask for use in generating an IC.

The different processes performed by the IC manufacturing system 902 may be implemented all in one location, e.g. by one party. Alternatively, the IC manufacturing system 902 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture logic without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 9 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 9, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

According to one aspect disclosed herein, there is provided a method as set out in the Summary section.

In embodiments, the processor may comprise a buffer comprising a plurality of slots, each respective one of the nodes in the tree being represented as an entry in a respective one of the plurality of slots. Said plurality of slots may be a fixed number of slots.

Different input nodes may be processed by different reinsertion processes, at least some of which are executed at least partially in parallel with one another. Each reinsertion process may be identified by a respective process ID.

In such embodiments, when one of the reinsertion processes frees a slot by removing a node from the tree, the method may comprise allowing the freed slot to be re-used to create a new node only by one of the reinsertion processes with a same process ID as the first reinsertion process.

That is, when a first one of the reinsertion processes processing one of the selected reinsertions frees a slot by removing the respective old parent from the tree, the respective slot may be re-used to store a new entry representing a new node newly created by a further of the selected reinsertions) in the same or a subsequent one of said iterations); and the method may comprise allowing the freed slot to be re-used to create the new node only by one of the reinsertion processes with a same process ID as the first reinsertion process.

In embodiments, the method may allow no freed slot to be used to store an entry representing any node other than a newly created node created by one of the reinsertion processes with the same process ID as the reinsertion process which freed the respective slot.

In embodiments, said one of the selected reinsertions processed by the first reinsertion process may comprise a reinsertion that leaves the respective old parent with only one remaining child, such that the respective old parent is removed from the tree and the remaining child becomes the child of the old parent's parent.

In embodiments, the further selected reinsertion may leave its respective old parent with at least two children, and create the newly created node as the respective new parent in order to accommodate the input node as a sibling of another, target node in the tree.

In embodiments, the processor comprises a buffer comprising a plurality of slots, each respective one of the nodes in the tree being represented as an entry in a respective one of the plurality of slots; wherein the graphics processor is configured to run a plurality of processes including at least some in parallel with one another, wherein each process is configured to process a respective one or more of the input nodes, each process being identified by a respective process ID; wherein in the updating step of at least one of the iterations, an old parent is removed from the tree and the old parent's respective slot is freed for storing a new entry representing a newly created node created by a further one of the selected reinsertions; and none of the freed slots is allowed to be used to store an entry representing any node other than a newly created node created by a process with the same process ID as that which freed the slot in the same or a preceding iteration.

In embodiments, the processing of each respective input node by the respective reinsertion process may comprise:
  performing the search for the candidate reinsertions of the respective input node,
  performing the scoring of the candidate reinsertions of the respective input node to determine the expected reduction in computational cost, and
  if any one of the candidate reinsertions of the respective input node is selected as a respective one of the selected reinsertions, performing an execution of the selected reinsertion by performing the updating of the current BVH with the respective selected reinsertion.

In embodiments, in the updating step of at least one of the iterations, at least one of the selected reinsertions may leave the respective old parent with more than one child, and/or gives the respective new parent more than two children.

In embodiments, in the searching step of at least one of the iterations, the one or more candidate reinsertions may include at least one candidate reinsertion that would change the number of children of the respective new parent from exactly two to more than two.

In embodiments, in the updating step of at least one of the iterations, at least one of the selected reinsertions may change the number of children of the respective new parent from exactly two to more than two.

In embodiments, in the searching step of at least one of the iterations, the one or more candidate reinsertions may include at least one candidate reinsertion that changes the number of children of the respective old parent from more than two children to exactly two children.

In embodiments, in the updating step of at least one of the iterations, at least one of the selected reinsertions may change the number of children of the respective old parent from more than two children to exactly two children.

In embodiments, in the searching step of at least one of the iterations, the one or more candidate reinsertions may comprise at least one candidate reinsertion that would leave the respective old parent with only one remaining child, such that the respective old parent would be removed from the tree and the remaining child would become the child of the old parent's parent.

In embodiments, in the updating step of at least one of the iterations, at least one of the selected reinsertions may comprise a reinsertion that leaves the respective old parent with only one remaining child, such that the respective old parent is removed from the tree and the remaining child becomes the child of the old parent's parent.

In embodiments, the method may comprise, after said one or more iterations, searching the tree of the current BVH to determine whether a modelled ray intersects with any of the primitives.

In embodiments, in each of one, some or all of the candidate reinsertions, the candidate reinsertion would reinsert only its one respective input node to another branch of the tree.

In embodiments, in each of one, some or all of the candidate reinsertions, the candidate reinsertion increases a number of child nodes at the new parent or adds a new node to the data structure as the new parent.

In embodiments the method may comprise outputting graphical data for controlling a screen to render a scene representing at least part of the modelled environment, including a lighting effect based on the modelled ray.

According to another aspect disclosed herein, there may be provided a method performed by a graphics processor, the method comprising:
  obtaining a starting BVH, bounding volume hierarchy, being a data structure comprising nodes representing different 3D regions of space in a modelled environment, the data structure comprising a tree in which the nodes are arranged hierarchically from a root node down to a plurality of leaf nodes, wherein the region modelled by each leaf node encompasses at least one primitive or part of a primitive;
  performing one or more iterations, starting with a first iteration which starts with the starting BVH as a current BVH, each iteration comprising:
    for each of a plurality of input nodes in the tree of the current BVH, searching for one or more candidate reinsertions which would move the input node from a respective old parent to a respective new parent in the tree, and which compared to the current BVH would reduce an expected computational cost of searching the tree to determine whether a modelled ray would intersect with one of the primitives; and updating the current BVH with one or more selected reinsertions from among the candidate reinsertions;

wherein in the searching step of at least one of the iterations, the one or more candidate reinsertions include at least one candidate reinsertion that would leave the old parent with more than one child, and/or give the new parent more than two children;

wherein the processor comprises a buffer comprising a plurality of slots, each respective one of the nodes in the tree being represented as an entry in a respective one of the plurality of slots;

wherein the graphics processor is configured to run a plurality of processes including at least some in parallel with one another, wherein each process is configured to process a respective one or more of the input nodes, each process being identified by a respective process ID;

wherein in the updating step of at least one of the iterations, an old parent is removed from the tree and the old parent's respective slot is freed for storing a new entry representing a newly created node created by a further one of the selected reinsertions; and wherein none of the freed slots is allowed to be used to store an entry representing any node other than a newly created node created by a process with the same process ID as that which freed the slot in the same or a preceding iteration.

According to another aspect disclosed herein there may be provided a processor comprising logic configured to perform any of the methods disclosed herein.

In embodiments the processor may be embodied in hardware on an integrated circuit.

According to another aspect, there is provided a method of manufacturing, using an integrated circuit manufacturing system, the processor of any embodiment disclosed herein.

According to another aspect, there is provided an integrated circuit definition dataset that, when processed in an integrated circuit manufacturing system, configures the integrated circuit manufacturing system to manufacture the processor of any embodiment disclosed herein.

According to another aspect there is provided an integrated circuit manufacturing system configured to manufacture the processor of any embodiment disclosed herein.

In embodiments the method may comprise steps corresponding to the operations of any embodiment disclosed herein.

According to another aspect there may be provided a graphics processing system configured to perform the method.

According to another aspect there is provided computer readable code configured to cause the method to be performed when the code is run.

According to another aspect there is provided a computer readable storage medium having encoded thereon the above-mentioned computer readable code.

According to further aspects disclosed herein, there may be provided a corresponding method of operating the processor, and a corresponding computer program configured to operate the processor. According to yet further aspects there may be provided a corresponding method of manufacturing the processor, a corresponding manufacturing facility arranged to manufacture the processor, and a corresponding circuit design data set embodied on computer-readable storage.

For instance according to one aspect there may be provided a non-transitory computer readable storage medium having stored thereon a computer readable description of the processor of any embodiment herein which, when processed in an integrated circuit manufacturing system, causes the integrated circuit manufacturing system to: process, using a layout processing system, the computer readable description of the logic or processor so as to generate a circuit layout description of an integrated circuit embodying said logic or processor; and manufacture, using an integrated circuit generation system, the logic or processor according to the circuit layout description.

According to another aspect, there may be provided an integrated circuit manufacturing system comprising: a non-transitory computer readable storage medium having stored thereon a computer readable description of the processor of any embodiment disclosed herein; a layout processing system configured to process the computer readable description so as to generate a circuit layout description of an integrated circuit embodying said logic or processor; and an integrated circuit generation system configured to manufacture the logic or processor according to the circuit layout description.

According to another aspect there may be provided a method of manufacturing, using an integrated circuit manufacturing system, the processor of any embodiment disclosed herein, the method comprising: processing, using a layout processing system, a computer readable description of said circuit so as to generate a circuit layout description of an integrated circuit embodying the logic or processor; and manufacturing, using an integrated circuit generation system, the logic or processor according to the circuit layout description.

According to another aspect there may be provided a layout processing system configured to determine positional information for logical components of a circuit derived from the integrated circuit description so as to generate a circuit layout description of an integrated circuit embodying the processor of any embodiment disclosed herein.

Other variants, implementations and/or applications of the disclosed techniques may become apparent to a person skilled in the art once given the disclosure herein. The scope of the present disclosure is not limited by the above-described embodiments but only by the following claims.

What is claimed is:

1. A method performed by a graphics processor, the method comprising:

obtaining a starting bounding volume hierarchy (BVH), being a data structure comprising nodes representing different 3D regions of space in a modelled environment, the data structure comprising a tree in which the nodes are arranged hierarchically from a root node down to a plurality of leaf nodes, wherein the region modelled by each leaf node encompasses at least one primitive or part of a primitive;

performing one or more iterations, starting with a first iteration which starts with the starting BVH as a current BVH, each iteration comprising:

for each of a plurality of input nodes in the tree of the current BVH, searching for one or more candidate reinsertions which would move the input node from a respective old parent to a respective new parent in the tree, and which compared to the current BVH would reduce an expected computational cost of searching the tree to determine whether a modelled ray would intersect with one of the primitives; and updating the current BVH with one or more selected reinsertions from among the candidate reinsertions;

wherein in the updating step of at least one of the iterations, the one or more selected reinsertions include at least one reinsertion that gives the new parent more than two children;

wherein the graphics processor comprises a buffer comprising a plurality of slots, each respective one of the nodes in the tree being represented as an entry in a respective one of the plurality of slots;

wherein the graphics processor is configured to run a plurality of processes including at least some in parallel with one another, wherein each process is configured to process a respective one or more of the input nodes, each process being identified by a respective process ID;

wherein in the updating step of at least one of the iterations, an old parent is removed from the tree and the old parent's respective slot in the buffer is freed for storing a new entry representing a newly created node created by a further one of the selected reinsertions; and wherein none of the freed slots in the buffer is allowed to be used to store an entry representing any node other than a newly created node created by a process with the same process ID as that which freed the slot in the same or a preceding iteration.

2. The method of claim 1, wherein in the updating step of at least one of the iterations, at least one of the selected reinsertions leaves the respective old parent with more than one child.

3. The method of claim 1, wherein in the searching step of at least one of the iterations, the one or more candidate reinsertions include at least one candidate reinsertion that would change the number of children of the respective new parent from exactly two to more than two.

4. The method of claim 3, wherein in the updating step of at least one of the iterations, at least one of the selected reinsertions changes the number of children of the respective new parent from exactly two to more than two.

5. The method of claim 1, wherein in the searching step of at least one of the iterations, the one or more candidate reinsertions include at least one candidate reinsertion that changes the number of children of the respective old parent from more than two children to exactly two children.

6. The method of claim 1, wherein in the searching step of at least one of the iterations, the one or more candidate reinsertions comprise at least one candidate reinsertion that would leave the respective old parent with only one remaining child, such that the respective old parent would be removed from the tree and the remaining child would become the child of the old parent's parent.

7. The method of claim 6, wherein in the updating step of at least one of the iterations, at least one of the selected reinsertions comprises a reinsertion that leaves the respective old parent with only one remaining child, such that the respective old parent is removed from the tree and the remaining child becomes the child of the old parent's parent.

8. The method of claim 7, wherein when an old parent is removed in one of said iterations, the respective slot is freed for storing a new entry representing a newly created node created by a further one of the selected reinsertions in the same or a subsequent one of said iterations.

9. The method of claim 8, wherein said plurality of slots is a fixed number of slots.

10. The method of claim 8, wherein the further selected reinsertion leaves its respective old parent with at least two children, and creates the newly created node as the respective new parent in order to accommodate the input node as a sibling of another, target node in the tree.

11. The method of claim 10, wherein the graphics processor is configured to run a plurality of processes including at least some in parallel with one another, wherein each process is configured to process a respective one or more of the input nodes, each process comprises one or more threads or shader invocations, and each process is identified by a respective process ID; wherein the processing of each respective input node comprises:

performing the search for the candidate reinsertions of the respective input node, performing scoring of the candidate reinsertions of the respective input node to determine the expected reduction in computational cost, and if any one of the candidate reinsertions of the respective input node is selected as a respective one of the selected reinsertions, performing an execution of the selected reinsertion by performing the updating of the current BVH with the respective selected reinsertion; and wherein in the execution of any of the selected reinsertions, none of the freed slots is allowed to be used to store an entry representing any input node other than a newly created node created by a process with the same process ID as that which freed the slot in the same or a preceding iteration.

12. The method of claim 11, wherein in the execution of at least one of the selected reinsertions, the freed slot is used to store an entry representing a newly created node created by a process with the same process ID as that which freed the slot in a preceding iteration.

13. The method of claim 11, further comprising one of said processes searching for a candidate reinsertion that would use a slot freed in a previous iteration, only if the slot was freed by a process in a previous iteration with the same respective process ID as said one of the processes.

14. The method of claim 1, wherein the method further comprises determining a starting score being a score of the starting BVH according to a metric for estimating an expected computational cost of searching the tree, wherein the first iteration starts with the starting score as a current score of the current BVH; and wherein in at least one of the iterations, the updating further comprises updating the current score to account for the update.

15. The method of claim 1, further comprising after said one or more iterations, searching the tree of the current BVH to determine whether a modelled ray intersects with any of the primitives.

16. The method of claim 15, further comprising outputting graphical data for controlling a screen to render a scene representing at least part of the modelled environment, including a lighting effect based on the modelled ray.

17. The method of claim 1, further comprising, in each of said iterations in between the identifying of the candidate reinsertions and the updating of the current BVH, performing a conflict resolution to determine whether any of the candidate reinsertions form a subset of conflicting reinsertions which would affect a same part of the tree as one another, and if so, from among each subset so to select only one of the candidate reinsertions as one of the selected reinsertions with which to update the current BVH, the other or others of the candidate reinsertions in the same subset being rejected for inclusion in the update.

18. A non-transitory computer readable storage medium having stored thereon computer executable code configured to, when run on a graphics processor, perform a method comprising:

obtaining a starting bounding volume hierarchy (BVH), being a data structure comprising nodes representing different 3D regions of space in a modelled environment, the data structure comprising a tree in which the nodes are arranged hierarchically from a root node down to a plurality of leaf nodes, wherein the region modelled by each leaf node encompasses at least one primitive or part of a primitive;

performing one or more iterations, starting with a first iteration which starts with the starting BVH as a current BVH, each iteration comprising:

for each of a plurality of input nodes in the tree of the current BVH, searching for one or more candidate reinsertions which would move the input node from a respective old parent to a respective new parent in the tree, and which compared to the current BVH would reduce an expected computational cost of searching the tree to determine whether a modelled ray would intersect with one of the primitives; and updating the current BVH with one or more selected reinsertions from among the candidate reinsertions;

wherein in the updating step of at least one of the iterations, the one or more selected reinsertions include at least one reinsertion that gives the new parent more than two children;

wherein the graphics processor comprises a buffer comprising a plurality of slots, each respective one of the nodes in the tree being represented as an entry in a respective one of the plurality of slots;

wherein the graphics processor is configured to run a plurality of processes including at least some in parallel with one another, wherein each process is configured to process a respective one or more of the input nodes, each process being identified by a respective process ID;

wherein in the updating step of at least one of the iterations, an old parent is removed from the tree and the old parent's respective slot in the buffer is freed for storing a new entry representing a newly created node created by a further one of the selected reinsertions; and wherein none of the freed slots in the buffer is allowed to be used to store an entry representing any node other than a newly created node created by a process with the same process ID as that which freed the slot in the same or a preceding iteration.

19. A graphics processor, comprising:

memory comprising one or more memory units; and processing apparatus comprising one or more execution units;

wherein the memory stores code arranged to run on the processing apparatus, the code being configured so as when run to perform a method comprising:

obtaining a starting bounding volume hierarchy (BVH), being a data structure comprising nodes representing different 3D regions of space in a modelled environment, the data structure comprising a tree in which the nodes are arranged hierarchically from a root node down to a plurality of leaf nodes, wherein the region modelled by each leaf node encompasses at least one primitive or part of a primitive;

performing one or more iterations, starting with a first iteration which starts with the starting BVH as a current BVH, each iteration comprising:

for each of a plurality of input nodes in the tree of the current BVH, searching for one or more candidate reinsertions which would move the input node from a respective old parent to a respective new parent in the tree, and which compared to the current BVH would reduce an expected computational cost of searching the tree to determine whether a modelled ray would intersect with one of the primitives, and updating the current BVH with one or more selected reinsertions from among the candidate reinsertions;

wherein in the updating step of at least one of the iterations, the one or more selected reinsertions include at least one reinsertion that gives the new parent more than two children;

wherein the graphics processor comprises a buffer comprising a plurality of slots, each respective one of the nodes in the tree being represented as an entry in a respective one of the plurality of slots;

wherein the graphics processor is configured to run a plurality of processes including at least some in parallel with one another, wherein each process is configured to process a respective one or more of the input nodes, each process being identified by a respective process ID;

wherein in the updating step of at least one of the iterations, an old parent is removed from the tree and the old parent's respective slot in the buffer is freed for storing a new entry representing a newly created node created by a further one of the selected reinsertions; and wherein none of the freed slots in the buffer is allowed to be used to store an entry representing any node other than a newly created node created by a process with the same process ID as that which freed the slot in the same or a preceding iteration.

\* \* \* \* \*